(12) United States Patent
Cha et al.

(10) Patent No.: US 12,556,289 B2
(45) Date of Patent: Feb. 17, 2026

(54) ELECTRONIC DEVICE PERFORMING OPERATION CORRESPONDING TO OVER-TEMPERATURE STATE AND METHOD FOR OPERATING THE SAME

(71) Applicant: SAMSUNG ELECTRONICS CO., LTD., Suwon-si (KR)

(72) Inventors: Jaemoon Cha, Suwon-si (KR); Jaewoo Park, Suwon-si (KR); Keonyoung Lee, Suwon-si (KR); Yeonjoo Lee, Suwon-si (KR); Minhwan Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 17/983,654

(22) Filed: Nov. 9, 2022

(65) Prior Publication Data

US 2023/0224051 A1    Jul. 13, 2023

Related U.S. Application Data

(63) Continuation of application No. PCT/KR2022/016358, filed on Oct. 25, 2022.

(30) Foreign Application Priority Data

Nov. 18, 2021    (KR) .................. 10-2021-0159728

(51) Int. Cl.
*H04B 17/11* (2015.01)
*H04B 1/40* (2015.01)
*H04B 17/21* (2015.01)

(52) U.S. Cl.
CPC ............... *H04B 17/11* (2015.01); *H04B 1/40* (2013.01); *H04B 17/21* (2015.01)

(58) Field of Classification Search
CPC . H04B 1/04; H04B 1/40; H04B 1/401; H04B 1/7097; H04B 17/00; H04B 17/101; H04B 17/11; H04B 17/21
See application file for complete search history.

(56) References Cited

U.S. PATENT DOCUMENTS 9,843,375 B2 * 12/2017 Kim ..................... H04B 1/006
10,992,356 B2 *  4/2021 Chen .................... H04B 7/0608
(Continued)

FOREIGN PATENT DOCUMENTS

| CN | 110049563 A | 7/2019 |
| EP | 048 791 A2 | 4/2009 |

(Continued)

OTHER PUBLICATIONS

PCT International Search Report dated Jan. 20, 2023 for PCT/KR2022/016358.

(Continued)

*Primary Examiner* — Quochien B Vuong
(74) *Attorney, Agent, or Firm* — Nixon & Vanderhye P.C.

(57) ABSTRACT

An electronic device may include at least one communication processor, at least one radio frequency integrated circuit (RFIC) configured to provide a radio frequency (RF) signal based on a signal from the at least one communication processor, and a first RF circuit and a second RF circuit configured to process and provide the RF signal. The at least one communication processor may be configured to control at least part of the electronic device to allow the first RF circuit to process at least one first RF signal provided from the RFIC, in an over-temperature state, identify that a sum of times when the first RF circuit processes the at least one first RF signal is at least the value of a designated period, and based on the sum of the times when the first RF circuit processes the at least one first RF signal being at least the value of the designated period, stop use of the first RF circuit (Continued)

and control at least part of the electronic device to allow the second RF circuit to process at least one second RF signal provided from the RFIC. Other various embodiments are possible as well.

19 Claims, 29 Drawing Sheets

(56) References Cited

U.S. PATENT DOCUMENTS

| | | | |
|---|---|---|---|
| 11,784,676 B2 * | 10/2023 | Lee | H04B 1/18 455/73 |
| 2014/0199993 A1 | 7/2014 | Dhanda et al. | |
| 2019/0319685 A1 | 10/2019 | Chen et al. | |
| 2020/0162891 A1 | 5/2020 | Hong | |
| 2020/0220572 A1 | 7/2020 | Kwon et al. | |
| 2020/0275526 A1 | 8/2020 | Sharma et al. | |

FOREIGN PATENT DOCUMENTS

| | | |
|---|---|---|
| EP | 1622286 B1 | 5/2010 |
| KR | 10-2008-0099681 A | 11/2008 |
| KR | 10-1690445 B1 | 12/2016 |
| KR | 10-2020-0033336 A | 3/2020 |
| KR | 10-2020-0062219 A | 6/2020 |
| KR | 10-2020-086067 A | 7/2020 |
| KR | 10-2020-0090081 A | 7/2020 |
| KR | 10-2287595 B1 | 8/2021 |
| WO | WO 2021-216485 A1 | 10/2021 |

OTHER PUBLICATIONS

PCT Written Opinion dated Jan. 20, 2023 for PCT/KR2022/016358.
Korean Office Action dated Dec. 10, 2025 for KR Application No. 10-2021-0159728.

* cited by examiner

| 0 | 1 | 2 | 3 | 4 | 5 | 6 | 7 | 8 | 9 |
|---|---|---|---|---|---|---|---|---|---|
| D | S | U | U | U | D | S | U | U | D |
| 10 | 11 | 12 | 13 | 14 | 15 | 16 | 17 | 18 | 19 |
| D | S | U | U | U | D | S | U | U | D |

FIG. 15A

ELECTRONIC DEVICE PERFORMING OPERATION CORRESPONDING TO OVER-TEMPERATURE STATE AND METHOD FOR OPERATING THE SAME

CROSS REFERENCE TO RELATED APPLICATION

This application is a continuation of International Application No. PCT/KR2022/016358 designating the United States, filed on Oct. 25, 2022 in the Korean Intellectual Property Receiving Office and claiming priority to Korean Patent Application No. 10-2021-0159728, filed on Nov. 18, 2021, the disclosures of which are all hereby incorporated herein by reference for all purposes as if fully set forth herein.

BACKGROUND

Field

Various example embodiments relate to an electronic device performing an operation corresponding to an over-temperature state and/or a method for operating the same.

Background

In order to meet the demand for wireless data traffic soring since the 4G communication system came on the market, 5G communication systems have been developed. Implementation considered to achieve a higher data transmission rate, 5G communication systems is to allow for use of a new band, e.g., ultra-high frequency band (e.g., the FR2 band), as well as the prior communication bands used for 3G or LTE. Electronic devices supporting mmWave, which is an ultra-high frequency band, may pack a plurality of antenna modules. mmWave radio channels get through high straightness and large path loss due to their nature of high frequency and, to make up for these issues, highly directional beamforming is essential and, to that end, a plurality of antenna modules are needed. For example, an electronic device may be equipped with a plurality of antenna modules that radiate signals in different directions. 5G communication technology allows for transmission of relatively much data and consumes more power, thus subject to a potential issue of causing the electronic device to heat up. For example, the electronic device consumes more power due to an increase in data throughput and use of a high frequency band, ending up causing more heat and hence overheating the antenna module in use or the surroundings of the antenna module. The overheating antenna module or surroundings may cause the user of the electronic device to feel uncomfortable and even a low-temperature burn. Furthermore, the components (e.g., battery) around the overheating antenna module may be damaged, and the overall performance of the electronic device may be deteriorated. Further, the electronic device may install and use various applications including a data transmission/reception function through 5G communication. When the electronic device executes an application in which the amount of data transmission/reception through 5G communication is excessive, the amount of heat generated may further increase due to the use of a high frequency band and an increase in data throughput.

SUMMARY

According to various example embodiments, an electronic device and an operation method thereof may switch the used RF circuit based at least on the period of accumulation actually used, when a heat generation state is identified.

According to various example embodiments, an electronic device may comprise at least one communication processor, at least one RFIC configured to provide an RF signal based at least on a signal from the at least one communication processor, and a first RF circuit and a second RF circuit configured to process and provide the RF signal. The at least one communication processor may be configured to control at least part of the electronic device to allow the first RF circuit to process at least one first RF signal provided from the RFIC in an over-temperature state, identify that a sum of times when the first RF circuit processes the at least one first RF signal is a designated period or more, and based at least on the sum of the times when the first RF circuit processes the at least one first RF signal being the designated period or more, stop use of the first RF circuit and control at least part of the electronic device to allow the second RF circuit to process at least one second RF signal provided from the RFIC.

According to various example embodiments, a method for operating an electronic device including at least one communication processor, at least one RFIC configured to provide an RF signal based at least on a signal from the at least one communication processor, and a first RF circuit and a second RF circuit configured to process and provide the RF signal may comprise controlling at least part of the electronic device to allow the first RF circuit to process at least one first RF signal provided from the RFIC in an over-temperature state, identifying that a sum of times when the first RF circuit processes the at least one first RF signal is a designated period or more, and based at least on the sum of the times when the first RF circuit processes the at least one first RF signal being the designated period or more, stopping use of the first RF circuit and controlling at least part of the electronic device to allow the second RF circuit to process at least one second RF signal provided from the RFIC.

According to various example embodiments, an electronic device may comprise at least one communication processor, at least one RFIC configured to provide an RF signal based at least on a signal from the at least one communication processor, and a first RF circuit and a second RF circuit configured to process and provide the RF signal. The at least one communication processor may be configured to, in an over-temperature state, control at least part of the electronic device to provide an RF signal of first transmission power to an antenna port of a first RF path corresponding to the first RF circuit and provide an RF signal of second transmission power to an antenna port of a second RF path corresponding to the second RF circuit, identify that a sum of times when the RF signal of the first transmission power is provided to the antenna port of the first RF path, and the RF signal of the second transmission power is provided to the antenna port of the second RF path is a designated period or more, and based at least on the sum of the times being the designated period or more, control at least part of the electronic device to provide the RF signal of the second transmission power to the antenna port of the first RF path corresponding to the first RF circuit and provide the RF signal of the first transmission power to the antenna port of the second RF path corresponding to the second RF circuit.

According to various example embodiments, there may be provided an electronic device and operation method thereof, which may switch the used RF circuit based at least on the period of accumulation of actual use when a heat generation state is identified. Accordingly, it is possible to prevent or reduce heat generation from worsening due to a relatively long-term use of any one RF circuit.

BRIEF DESCRIPTION OF THE DRAWINGS

The above and other aspects, features, and advantages of certain example embodiments of the present disclosure will be more apparent from the following detailed description, taken in conjunction with the accompanying drawings, in which:

FIG. 15A illustrates an example of a time division-uplink-downlink configuration according to various embodiments;

DETAILED DESCRIPTION

Figure 1:
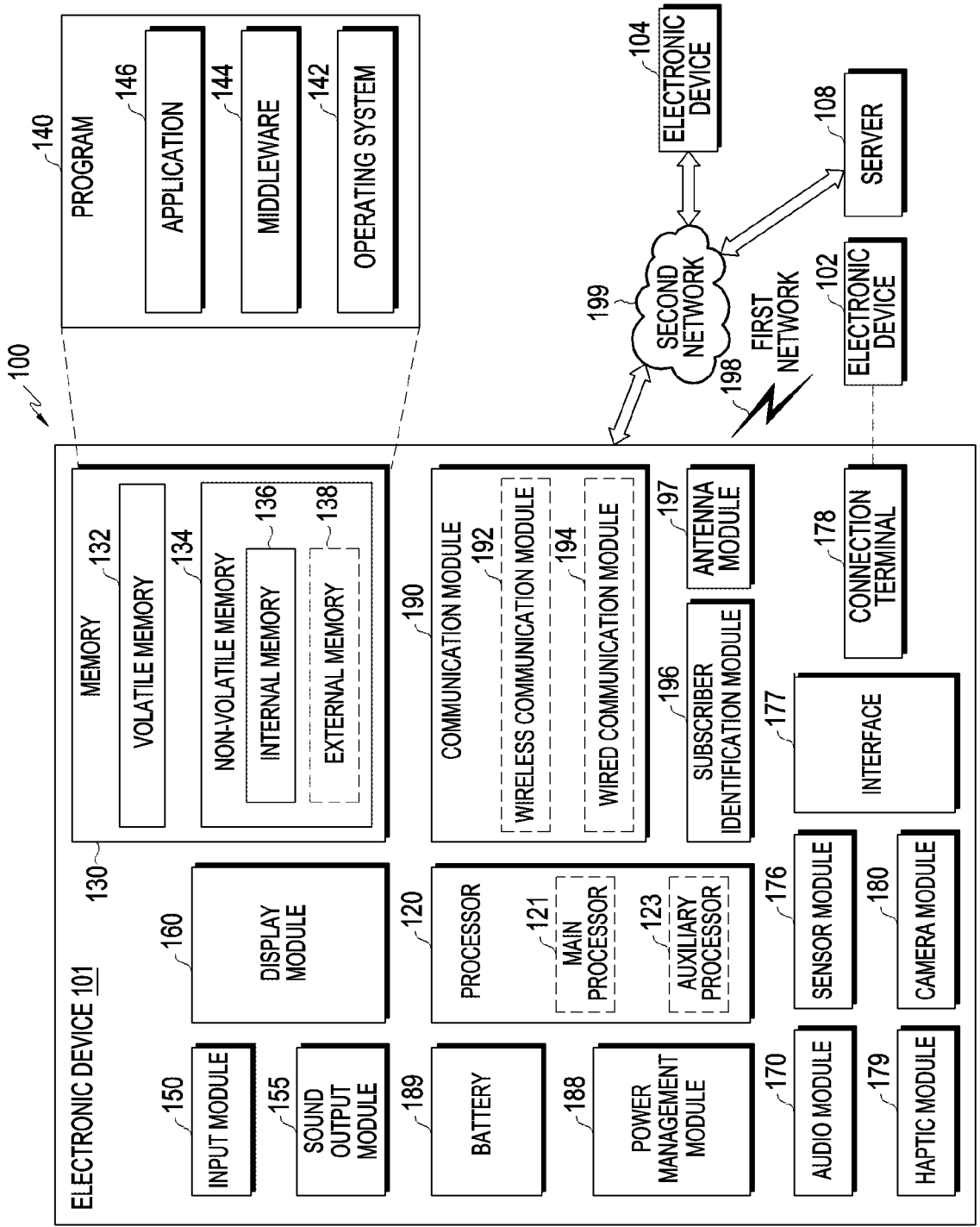
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
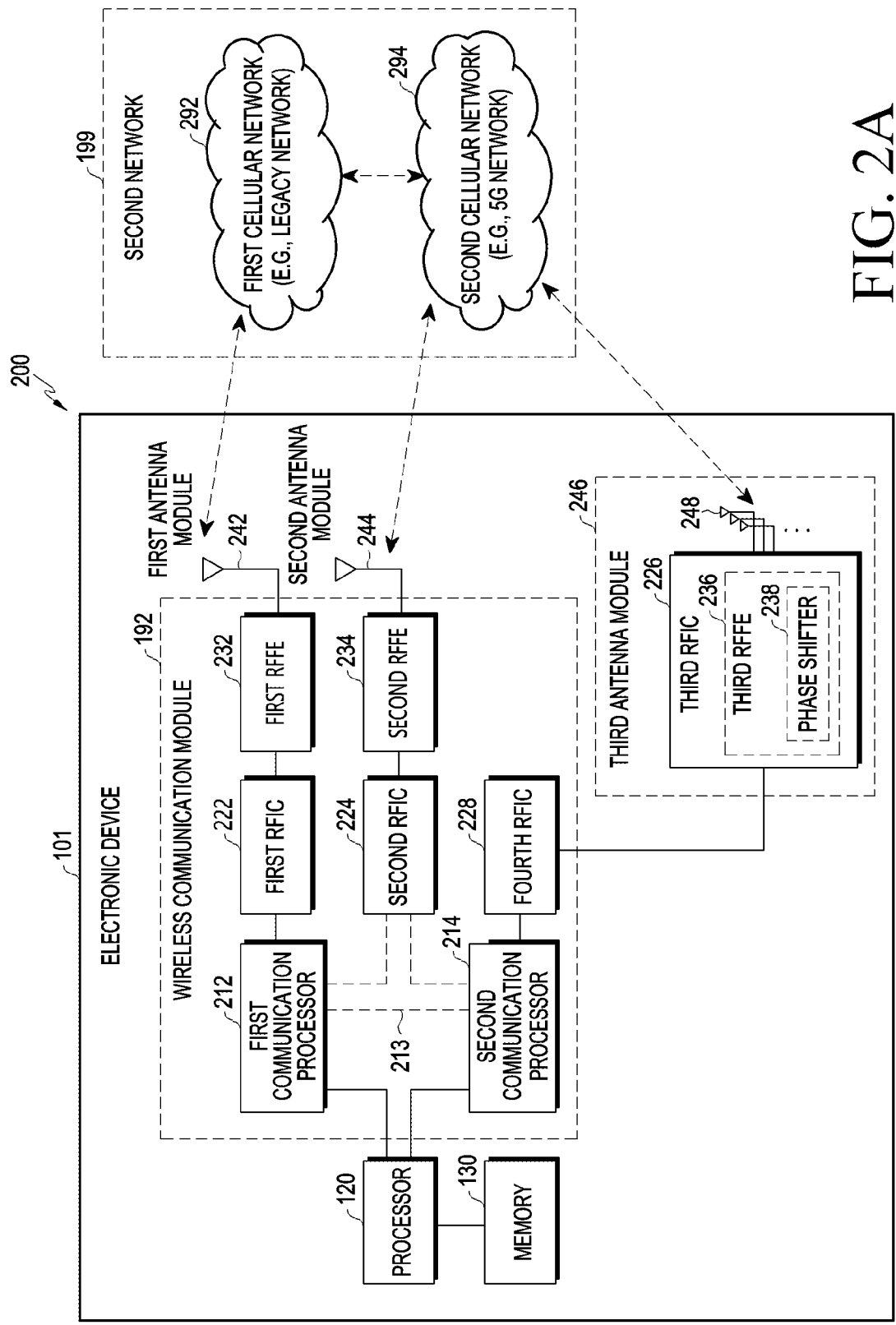
FIG. 2A is a block diagram illustrating an electronic device for supporting legacy network communication and 5G network communication according to various embodiments.

FIG. 2A is a block diagram 200 illustrating an electronic device 101 for supporting legacy network communication and 5G network communication according to various embodiments. Referring to FIG. 2A, the electronic device 101 may include a first communication processor 212 (including communication processing circuitry), a second communication processor 214 (including communication processing circuitry), a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. Each antenna module herein may include at least one antenna. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192 (including communication circuitry). According to another embodiment, the fourth RFIC 228 may be omitted or be included as part of the third RFIC 226. Each "processor" herein may include processing circuitry, and each "module" herein may include corresponding circuitry.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
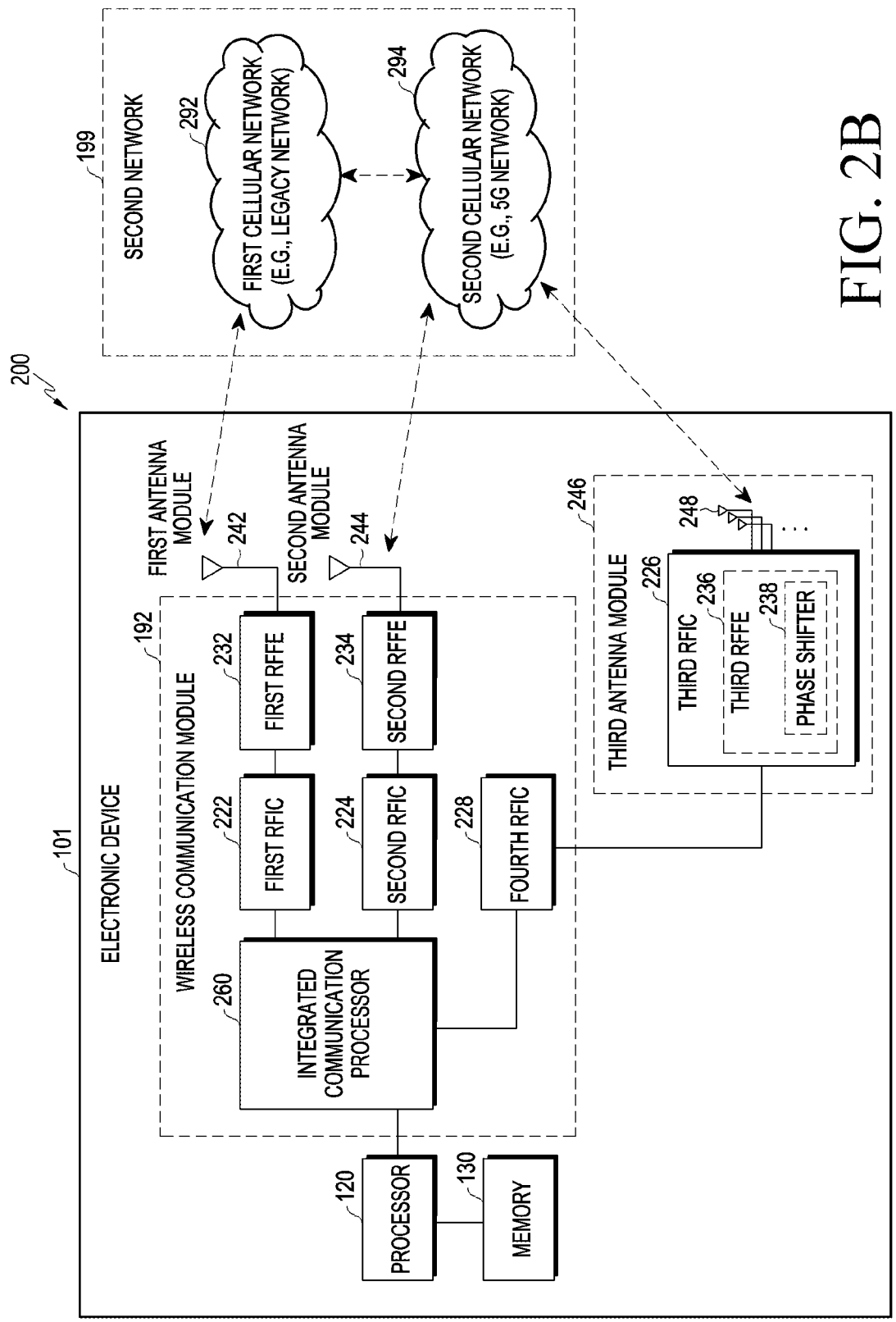
FIG. 2B is a block diagram illustrating an electronic device for supporting legacy network communication and 5G network communication according to various embodiments.

According to an embodiment, the first communication processor 212 and the second communication processor 214 may be implemented in a single chip or a single package. According to an embodiment, the first communication processor 212 and/or the second communication processor 214, along with the processor 120, an auxiliary processor 123, or communication module 190, may be formed in a single chip or single package. For example, as shown in FIG. 2B, a communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Meanwhile, a communication processor (e.g., at least one of the first communication processor 212, the second communication processor 214, or the integrated communication processor 260) may be implemented as an integrated circuit and, in this case, may also include at least one storage circuit for storing at least one instruction to trigger to perform an operation according to various embodiments and at least one processing circuit to execute at least one instruction.

Each embodiment herein can be used in combination with any other embodiment described herein.

Figure 3A:
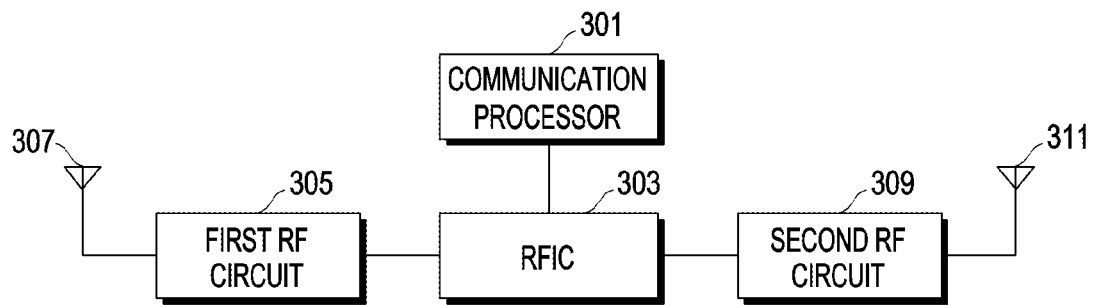
FIG. 3A is a block diagram illustrating an electronic device including a plurality of RF circuits according to various embodiments.

FIG. 3A is a block diagram illustrating an electronic device including a plurality of RF circuits according to various embodiments.

According to various embodiments, the electronic device 101 may include at least one of a communication processor 301, an RFIC 303, a first RF circuit 305, a first antenna 307, a second RF circuit 309, or a second antenna 311. The communication processor 301 may include at least one of, e.g., the first communication processor 212, the second communication processor 214, or the integrated communication processor 260. The RFIC 303 may include at least one of the first RFIC 222, the second RFIC 224, the third RFIC 226, or the fourth RFIC 228. The first RF circuit 305 may process (e.g., amplify) the RF signal output from the RFIC 303 and provide it to the first antenna 307. The second RF circuit 309 may process (e.g., amplify) the RF signal output from the RFIC 303 and provide it to the second antenna 311. At least one of the first RF circuit 305 or the second RF circuit 309 may include at least one of the first RFFE 232, the second RFFE 234 or the third RFFE 236, or may include an additional RFFE not shown in FIG. 2A or 2B. For example, in FIG. 2A or FIG. 2B, one RFFE (e.g., the first RFFE 232) is illustrated as being connected to one RFIC (e.g., the first RFIC 222), but as in FIG. 3A, two RFFEs (e.g., the first RF circuit 305 or the second RF circuit 309) may be connected to the RFIC 303 included in the electronic device 101 according to various embodiments. The RFFE may include at least one of a power amplifier module (PAM), front end module (FEM), power amplifier module including duplexer (PAMiD), LNA and PAM with integrated duplexer or diplexer (LPAMID), or PA with integrated low noise amplifier and filter (LPAMIF) but is not limited to a specific type. At least one of the first RF circuit 305 or the second RF circuit 309 may further include an additional module (e.g., average power tracking (APT) and/or envelope tracking (ET) function providing module (e.g., PAPM)), as well as, e.g., an RFFE. The frequency range supported by the first RF circuit 305 and the frequency range supported by the second RF circuit 309 may at least partially overlap. For example, the first RF circuitry 305 and the second RF circuitry 309 both may be RF circuits configured to process a mid-band and/or a high band (e.g., 1.8 GHz to 2.5 GHz), but are not limited thereto. For example, both the first RF circuit 305 and the second RF circuit 309 may be RF circuits configured to process very high frequency bands (e.g., N77 operating band to N79 operating band), but are not limited thereto. Accordingly, an RF signal having a specific frequency may be processed through the first RF circuit 305 or may be processed through the second RF circuit 309, in which case a transmission signal may be provided as SISO to the base station. Alternatively, an RF signal having a specific frequency may be processed through both the first RF circuit 305 and the second RF circuit 309, in which case a transmission signal may be provided as MIMO to the base station. As is described below, if it is not an over-temperature state, the RF signal may be processed only through the first RF circuit 305 for a designated period or more, or the RF signal may be processed only through the second RF circuit 309 for a designated period or more, or the RF signal may be processed through the first RF circuit 305 and the second RF circuit 309 for a designated period or more. Meanwhile, in the over-temperature state, during the designated period, the first RF circuit 305 and the second RF circuit 309 may alternately process the RF signal so that a chance of an increase in temperature due to a relatively long-term continuous use of any one RF circuit may be reduced.

According to various embodiments, the communication processor 301 may identify whether it is in the over-temperature state or the over-temperature level. For example, the communication processor 301 may identify the over-temperature state or over-temperature level based on receiving an indication (or over-temperature level information) indicating whether it is the over-temperature state from other hardware (e.g., a processor, e.g., an AP, or a temperature management module). Or, the communication processor 301 may obtain temperature information and identify whether it is the over-temperature state or the over-temperature level based on the temperature information. If the over-temperature state is identified or the over-temperature level meets a designated condition, the communication processor 301 may control the RFIC 303 to allow the first RF circuit 305 and the second RF circuit 309 to alternately process the RF signal. The RFIC 303 may be configured to convert the baseband signal received from, e.g., the communication processor 301 into an RF signal and provide the RF signal to at least one of the first RF circuit 305 or the second RF circuit 309. The RFIC 303 may alternately provide the converted RF signal to the first RF circuit 305 and the second RF circuit 309 under the control of the communication processor 301 so that switching of the RF circuits may be performed. Meanwhile, that the communication processor 301 performs RF circuit switching by controlling the RFIC 303 is merely an example, and it will be appreciated by one of ordinary skill in the art that there is no limitation to implementation examples for RF circuit switching.

According to various embodiments, at least one of the first RF circuit 305 or second RF circuit 309 may perform, e.g., processing of the reception signal. At least one of the first RF circuit 305 or second RF circuit 309 may low-noise amplify the RF signal received from at least one of the first antenna 307 or second antenna 311 and provide it to the RFIC 303. For example, if it is not an over-temperature state, the RF signal may be processed (e.g., low-noise amplification) only through the first RF circuit 305 for a designated period or more, or the RF signal may be processed only through the second RF circuit 309 for a designated period or more, or the RF signal may be processed through the first RF circuit 305 and the second RF circuit 309 for a designated period or more. Meanwhile, in the over-temperature state, during the designated period, the first RF circuit 305 and the second RF circuit 309 may alternately process the RF signal so that a chance of an increase in temperature due to a relatively long-term continuous use of any one RF circuit may be reduced. It will be understood by one of ordinary skill in the art that switching of RF circuits for processing transmission signals in various embodiments of the disclosure may be replaced with switching of RF circuits for processing reception signals.

Figure 3B:
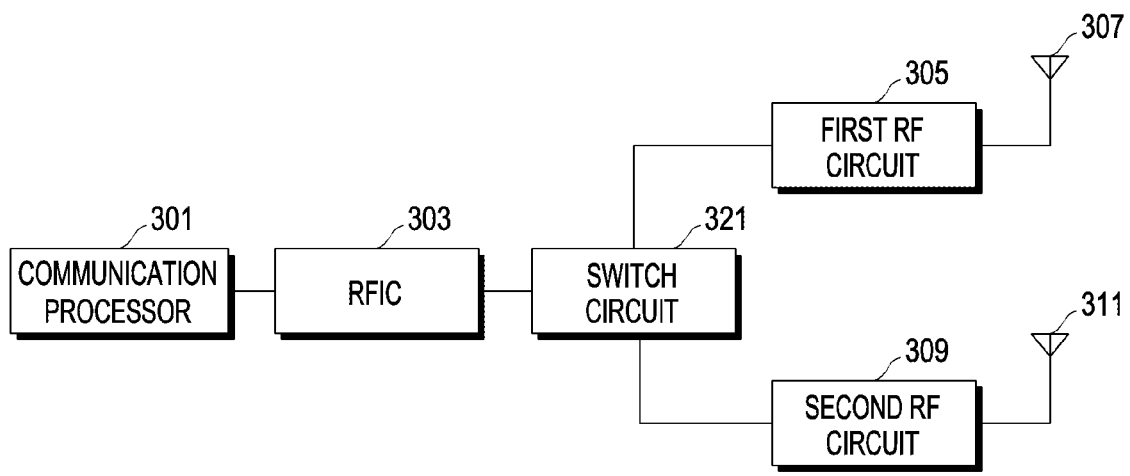
FIG. 3B is a block diagram illustrating an electronic device including a plurality of RF circuits according to various embodiments.

FIG. 3B is a block diagram illustrating an electronic device including a plurality of RF circuits according to various embodiments.

According to various embodiments, the electronic device 101 may include at least one of a communication processor 301, an RFIC 303, a first RF circuit 305, a first antenna 307, a second RF circuit 309, a second antenna 311, or a switch circuit 321. As compared with the embodiment of FIG. 3A, the electronic device 101 of the embodiment of FIG. 3B may further include the switch circuit 321. The switch circuit 321 may provide the RF signal from the RFIC 303 to at least one of the first RF circuit 305 and the second RF circuit 309. According to various embodiments, if it is identified to be in the over-temperature state or the over-temperature level meets a designated condition, the communication processor 301 may be operated to allow the first RF circuit 305 or second RF circuit 309 to alternately process the RF signal. For example, the communication processor 301 may control the switch circuit 321 to provide the RF signal to the first RF circuit 305. Thereafter, the communication processor 301 may control the switch circuit 321 to provide the RF signal to the second RF circuit 309. As described above, switching of the RF circuits 305 and 309 may be performed, but it will be understood by one of ordinary skill in the art that this is exemplary and there is no limitation on the subject and/or scheme for controlling the switching.

Figure 3C:
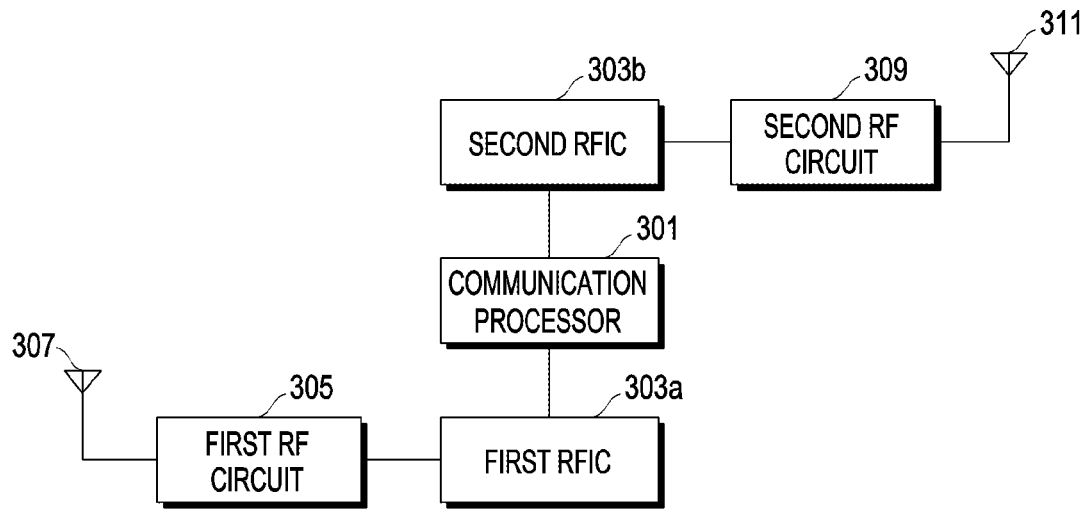
FIG. 3C is a block diagram illustrating an electronic device including a plurality of RF circuits according to various embodiments.

FIG. 3C is a block diagram illustrating an electronic device including a plurality of RF circuits according to various embodiments.

According to various embodiments, the electronic device 101 may include at least one of a communication processor 301, a first RFIC 303*a*, a first RF circuit 305, a first antenna 307, a second RFIC 303*b*, a second RF circuit 309, or a second antenna 311. In contrast to the embodiment of FIG. 3A in which the plurality of RF circuits 305 and 309 are connected to one RFIC 303, in the embodiment of FIG. 3C, a plurality of RFICs 303*a* and 303*b* are connected to one communication processor 301, and the plurality of RF circuits 305 and 309 respectively may be connected to the plurality of RFICs 303*a* and 303*b*. According to various embodiments, if it is identified to be in the over-temperature state or the over-temperature level meets a designated condition, the communication processor 301 may be operated to allow the first RF circuit 305 or second RF circuit 309 to alternately process the RF signal. For example, the communication processor 301 may provide a baseband signal to the first RFIC 303*a*, and the first RFIC 303*a* may convert the baseband signal into an RF signal and provide the RF signal to the first RF circuit 305. Thereafter, the communication processor 301 may provide a baseband signal to the second RFIC 303*b*, and the second RFIC 303*b* may convert the baseband signal into an RF signal and provide the RF signal to the second RF circuit 309. As described above, switching of the RF circuits 305 and 309 may be performed, but it will be understood by one of ordinary skill in the art that this is exemplary and there is no limitation on the subject and/or scheme for controlling the switching.

Figure 3D:
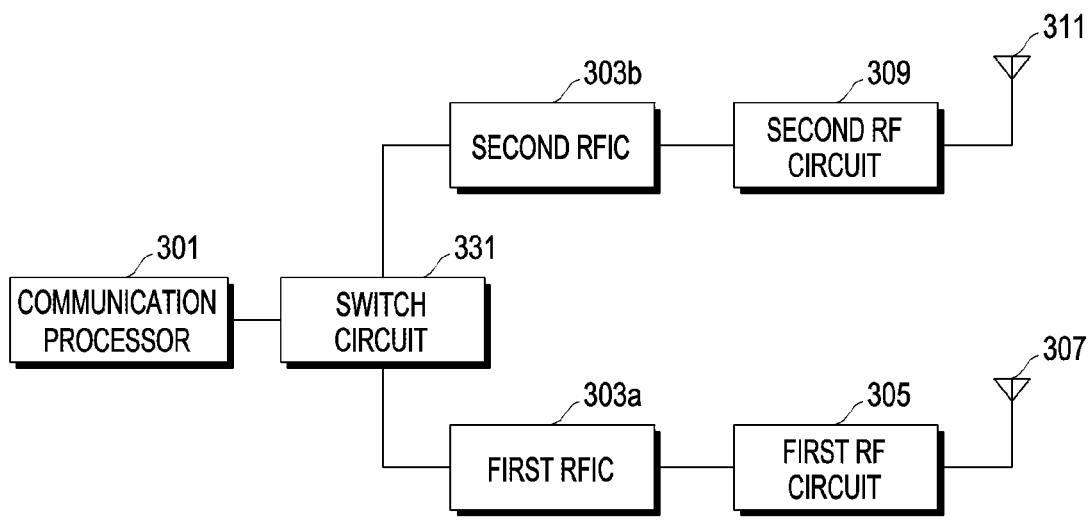
FIG. 3D is a block diagram illustrating an electronic device including a plurality of RF circuits according to various embodiments.

FIG. 3D is a block diagram illustrating an electronic device including a plurality of RF circuits according to various embodiments.

According to various embodiments, the electronic device 101 may include at least one of a communication processor 301, a first RFIC 303a, a second RFIC 303b, a first RF circuit 305, a first antenna 307, a second RF circuit 309, a second antenna 311, or a switch circuit 331. As compared with the embodiment of FIG. 3C, the electronic device 101 of the embodiment of FIG. 3D may further include the switch circuit 331. The switch circuit 331 may provide the baseband signal from the communication processor 301 to at least one of the first RFIC 303a or the second RFIC 303b. According to various embodiments, if it is identified to be in the over-temperature state or the over-temperature level meets a designated condition, the communication processor 301 may be operated to allow the first RF circuit 305 or second RF circuit 309 to alternately process the RF signal. For example, the communication processor 301 may control the switch circuit 331 to provide a baseband signal to the first RFIC 303a. During this time, the first RFIC 303a may convert the obtained baseband signal into an RF signal and provide it to the first RF circuit 305. The first RF circuit 305 may process (e.g., amplify) and provide the obtained RF signal. Thereafter, the communication processor 301 may control the switch circuit 331 to provide a baseband signal to the second RFIC 303b. During this time, the second RFIC 303b may convert the obtained baseband signal into an RF signal and provide it to the second RF circuit 309. The second RF circuit 309 may process (e.g., amplify) and provide the obtained RF signal. As described above, switching of the RF circuits 305 and 309 may be performed, but it will be understood by one of ordinary skill in the art that this is exemplary and there is no limitation on the subject and/or scheme for controlling the switching.

As described above, the RF circuits that process (e.g., amplify) the RF signal may be changed (or switched), and a chance of an increase in temperature due to a relatively long-term use of one RF circuit may be mitigated.

Figure 4:
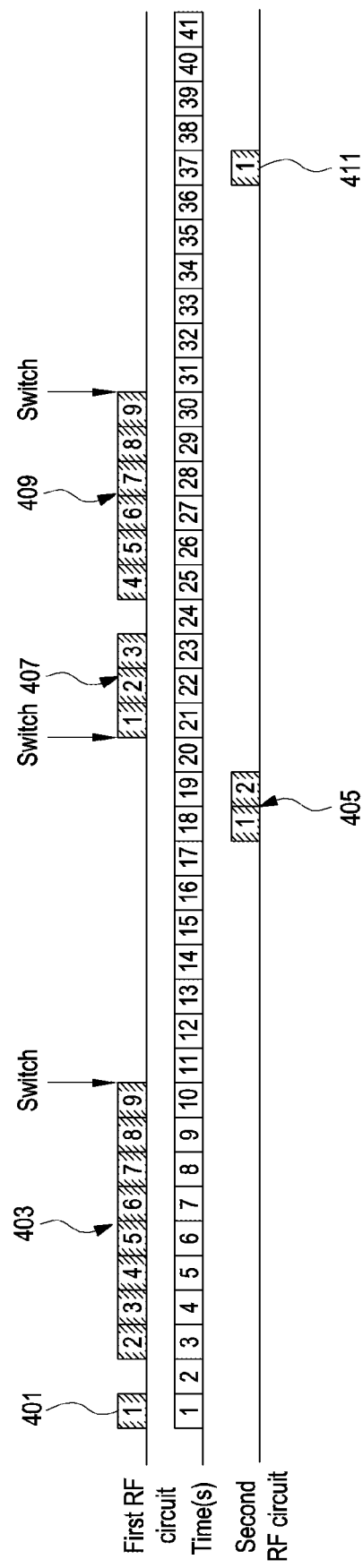
FIG. 4 is a view illustrating switching RF circuits according to various embodiments.

FIG. 4 is a view illustrating switching RF circuits according to various embodiments.

According to various embodiments, when an over-temperature state is identified or an over-temperature level meets a designated condition (e.g., a specific level), the electronic device 101 may switch RF circuits for processing RF signals. For example, it is assumed in the embodiment of FIG. 4 that the switching period of the RF circuit is 10 seconds (s). Meanwhile, in the embodiment of FIG. 4, the unit of the switching period is the second (s) but this is exemplary. The unit for counting the switching period may be changed into the frame, subframe, slot, or other various ones without limitations in type. The electronic device 101 may allocate a period of 0 seconds to 10 seconds to the first RF circuit 305. The electronic device 101 may be operated to process the RF signal using the first RF circuit 305 during a first period 401 (e.g., 0 seconds to 1 second) and during a second period 403 (e.g., 3 seconds to 10 seconds). Various examples for processing the RF circuit using the first RF circuit 305 have been described above in connection with FIGS. 3A to 3D, and no detailed description thereof is given below. Meanwhile, during a partial period (e.g., 1 second to 2 seconds) of the period of 0 seconds to 10 seconds, no transmission data may exist, or the corresponding period may be set to perform downlink from the network. In this case, the electronic device 101 may not use the first RF circuit 305 during the partial period (e.g., 1 second to 2 seconds).

According to various embodiments, if the switching period, 10 seconds, elapses, the electronic device 101 may switch the RF circuit for processing the RF signal. The electronic device 101 may allocate a period of 10 seconds to 20 seconds, corresponding to the switching period, 10 seconds, to the second RF circuit 309. The electronic device 101 may be operated to process the RF signal using the second RF circuit 309 during a third period 405 (e.g., 7 seconds to 9 seconds). Various examples for processing the RF circuit using the second RF circuit 309 have been described above in connection with FIGS. 3A to 3D, and no detailed description thereof is given below. Meanwhile, during a partial period (e.g., 10 second to 17 seconds and 19 seconds to 20 seconds) of the period of 10 seconds to 20 seconds, no transmission data may exist, or the corresponding period may be set to perform downlink from the network. In this case, the electronic device 101 may not use the second RF circuit 309 during the partial period (e.g., 10 second to 17 seconds and 19 seconds to 20 seconds). Thereafter, the electronic device may switch the RF circuit for processing the RF signal whenever the switching period of 10 seconds elapses. The first RF circuit 305 may process the RF signal during a fourth period 407 and a fifth period 409. During a sixth period 411, the second RF circuit 309 may process the RF signal. As described above, it is possible to prevent or reduce the heat generation state of one RF circuit from worsening due to continuous use of one RF circuit by changing the RF circuits for processing the RF signal.

Figure 5A:
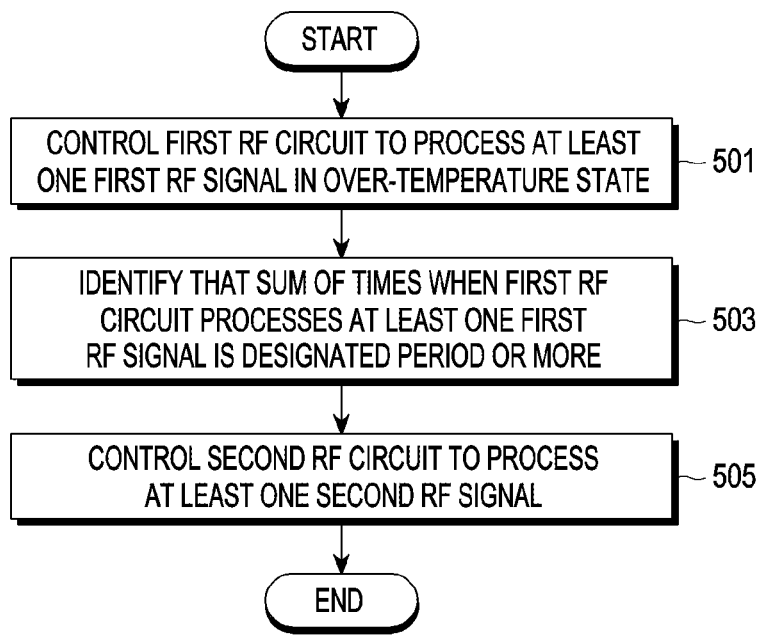
FIG. 5A illustrates a method for operating an electronic device according to various embodiments.
Figure 5B:
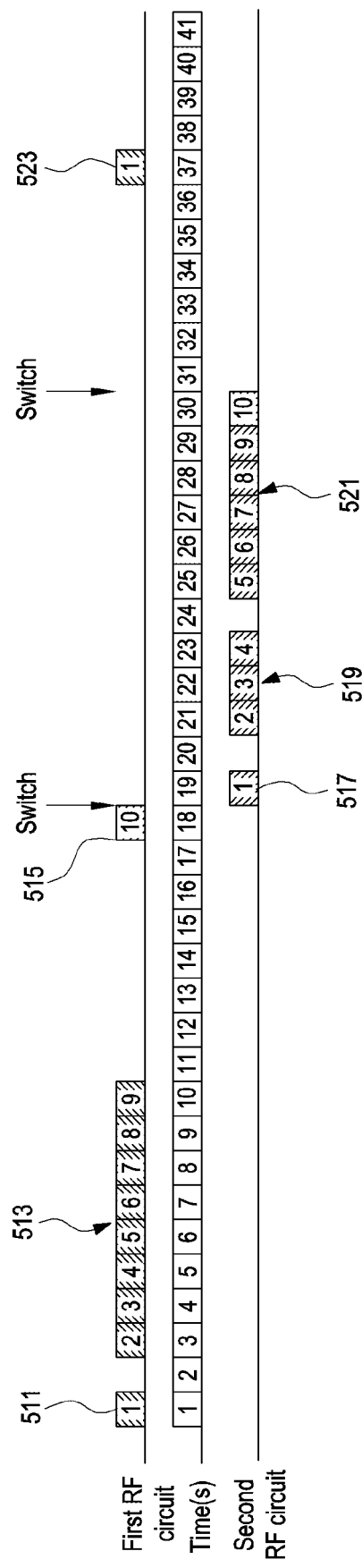
FIG. 5B is a view illustrating switching RF circuits according to various embodiments.

FIG. 5A illustrates a method for operating an electronic device according to various embodiments. The embodiment of FIG. 5A is described with reference to FIG. 5B. FIG. 5B is a view illustrating switching RF circuits according to various embodiments.

According to various embodiments, the electronic device 101 (e.g., the communication processor 301) may control the electronic device 101 to allow the first RF circuit 305 to process at least one first RF signal in an over-temperature state in operation 501. For example, the electronic device 101 may control the RFIC 303 to provide at least one first RF signal to the first RF circuit 305 as shown in FIG. 3A. For example, the electronic device 101 may control the switch circuit 321 to allow the first RF circuit 305 to process at least one first RF signal as shown in FIG. 3B. For example, as shown in FIG. 3C, the electronic device 101 may provide a baseband signal to the first RFIC 303a to allow the first RF circuit 305 to process at least one first RF signal. For example, the electronic device 101 may control the switch circuit 331 to allow the first RF circuit 305 to process at least one first RF signal as shown in FIG. 3D. Meanwhile, the embodiments of FIGS. 3A to 3D are merely examples, and the scheme in which any one of the plurality of RF circuits processes RF signals is not limited. The electronic device 101 may include at least one sensor module 176 for measuring the temperature of the inside (or surface) of the electronic device 101. The electronic device 101 may identify whether it is in the over-temperature state based on the temperature from the at least one sensor module 176 (including at least one sensor). The over-temperature state may mean, but is not limited to, e.g., a state in which the measured temperature (or a processed value, such as the average of a plurality of temperatures, or minimum value is a threshold temperature or more. Or, the over-temperature state may also mean a state in which an increase rate of temperature is a threshold increase rate or more. Or, the electronic device 101 may identify over-temperature levels. The over-temperature levels may correspond to a plurality of ranges. For example, a range from 44° C. to 53° C. may be a first over-temperature level, a range from 53° C. to 57° C. may be a second over-temperature level, and a range over 57° C. may be a third over-temperature level. The electronic device 101 may identify the over-temperature level being a designated level (or more) as the over-temperature state. Or, the electronic device 101 may identify detection of an event (e.g., execution of a game application or operation of the camera module) triggering a relatively large amount of heat generation as the over-temperature state, but the type of the event is not limited. As described above, the communication processor 301 (including communication processing circuitry) may receive an indication indicating the over-temperature state or over-temperature level information from the processor 120 (e.g., an AP). Or, the communication processor 301 may obtain temperature information directly from at least one sensor module 176 or from other hardware (e.g., an AP or a temperature management module) and identify the over-temperature state based on the obtained temperature information. Based on identifying the over-temperature state, the electronic device 101 may determine to periodically switch the RF circuit for processing RF signals.

According to various embodiments, in operation 503, the electronic device 101 may identify that the sum of times when the first RF circuit 305 processes at least one first RF signal is a designated period or more. Here, the RF signal may include at least one of the RF signal corresponding to at least one of the PUCCH, SRS, or PRACH as well as the RF signal corresponding to the PUSCH, and the type of the physical channel is not limited. Based at least on the sum of the times when the first RF circuit 305 processes the at least one first RF signal being the designated period or more, the electronic device 101 may control the second RF circuit 309 to process at least one second RF signal in operation 505. For example, the electronic device 101 may switch the RF circuit for processing RF signals. For example, referring to FIG. 5B, the electronic device 101 may control the first RF circuit 305 to process the first RF signal during a first period 511 (e.g., 0 seconds to 1 second). In the embodiment of FIG. 5B, it is assumed that the period is 10 seconds. Since the sum, e.g., 1 second, of the times when the first RF circuit 305 processes the at least one first RF signal is less than the period, 10 seconds, the electronic device 101 may maintain the RF signal processing by the first RF circuit 305. As no transmission data exists and/or transmission of an uplink signal is not allowed during the period of 1 second to 2 seconds, the first RF circuit 305 may not process the RF signal either. The electronic device 101 may control the first RF circuit 305 to process the first RF signal during a second period 513 (e.g., 2 seconds to 10 seconds). Since the sum, e.g., 1+8=9 seconds, of the times when the first RF circuit 305 processes the at least one first RF signal is less than the period, 10 seconds, the electronic device 101 may maintain the RF signal processing by the first RF circuit 305. As no transmission data exists or transmission of an uplink signal is not allowed during the period of 10 second to 18 seconds, the first RF circuit 305 may not process the RF signal either. The electronic device 101 may control the first RF circuit 305 to process the first RF signal during a first period 515 (e.g., 18 seconds to 19 seconds). Based at least on the sum, e.g., 1+8+1=10 seconds, of the times when the first RF circuit 305 processes the at least one first RF signal being the period, 10 seconds, or more, the electronic device 101 may switch the RF circuit for processing RF signals to the second RF circuit 309. As the RF circuit is switched, the sum of use times of the RF circuit (e.g., the first RF circuit 305) before switching may be reset to 0. The second RF circuit 309 may process at least one second RF signal during a fourth period 517 (e.g., 19 seconds to 20 seconds), a fifth period 519 (e.g., 21 seconds to 23 seconds), and a sixth period 521 (e.g., 24 seconds to 30 seconds). The second RF circuit 309 may not process an RF signal for 20 seconds to 21 seconds and for 23 seconds to 24 seconds. Based on the sum of processing times of at least one second RF signal being the designated period, 10 seconds, or more, the electronic device 101 may switch the RF circuit for processing RF signals to the first RF circuit 305. As the RF circuit is switched, the sum of use times of the RF circuit (e.g., the second RF circuit 309) before switching may be reset to 0. As another example, according to the switching of the RF circuit, the sum of use times of the RF circuit (e.g., the second RF circuit 309) before switching may be reset to a value which is the existing sum less a designated value (e.g., 10 seconds), and the resetting scheme is not limited. The first RF circuit 305 may process at least one third RF signal during a seventh period 523. Although not shown, based at least on the sum of RF signal processing times of the first RF circuit 305 being 10 seconds or more, the electronic device 101 may switch the RF circuit for processing RF signals back to the second RF circuit 309. According to the foregoing description, the periods during which the RF circuits actually process RF signals may be uniformly distributed. For example, the electronic device 101 may identify whether there is a transmission signal every slot (or subframe) (in other words, whether there is an RF signal to be processed). Or, the electronic device 101 may also identify the slot (or subframe) where a transmission signal exists, based at least on being allowed for uplink scheduling.

Meanwhile, in FIGS. 5A and 5B, it is described that the same time period is allocated to the first RF circuit 305 or second RF circuit 309, but this is exemplary. According to various embodiments, the electronic device 101 may allocate different periods to the first RF circuit 305 or second RF circuit 309, respectively. For example, when it is identified that the temperature of the first RF circuit 305 is higher than the temperature of the second RF circuit 309, the electronic device 101 may allow the time period allocated to the second RF circuit 309 to be longer than the time period allocated to the first RF circuit 305, but the example of setting differently is not limited. Meanwhile, in the embodiments of FIGS. 5A and 5B, switching for two RF circuits is described, but this is exemplary, and it will be appreciated by one of ordinary skill in the art that the number of RF circuits to be switched according to various embodiments of the disclosure is not limited.

Figure 5C:
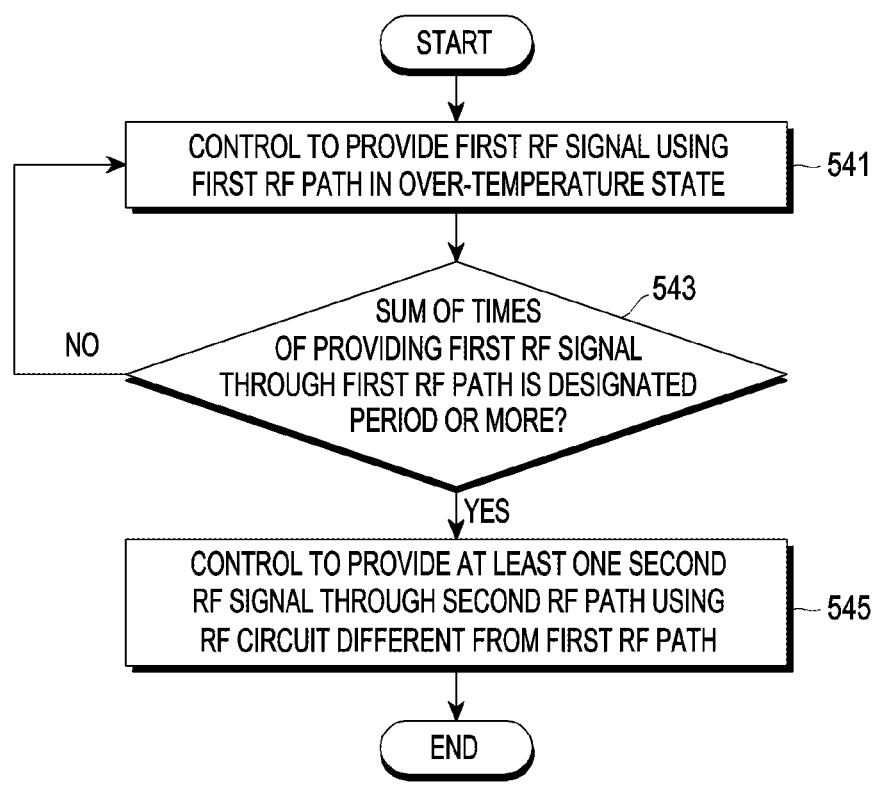
FIG. 5C illustrates a method for operating an electronic device according to various embodiments.

FIG. 5C illustrates a method for operating an electronic device according to various embodiments.

According to various embodiments, the electronic device 101 (e.g., the communication processor 301) may control the electronic device 101 to provide a first RF signal using a first RF path in an over-temperature state in operation 541. The first RF path may be defined by, e.g., at least one piece of hardware (e.g., the RFIC 303, the first RF circuit 305, and the first antenna 307 in FIG. 3A) including the first RF circuit 305. Providing the RF signal through the first path may mean performing at least one operation for each of at least one piece of hardware to output the RF signal to another piece of connected hardware and/or that an antenna receives an RF signal. For example, the second RF path may be defined by the RFIC 303, the second RF circuit 309, and the second antenna 311 in the embodiment of FIG. 3A. Meanwhile, it will be appreciated by one of ordinary skill in the art that a plurality of RF paths may be defined in other embodiments than the embodiment of FIG. 3A. The electronic device 101 may allocate and/or manage identification information per RF path. In operation 543, the electronic device 101 may identify whether the sum of times of having processed the first RF signal through the first RF path is a designated period or more. If the time of times of having provided the first RF signal through the first RF path is less than the designated period (No in 543), the electronic device 101 may control the electronic device 101 to provide the RF signal through the first path. If the sum of times of having provided the first RF signal through the first RF path is the designated period or more (Yes in 543), the electronic device 101 may control the electronic device 101 to provide at least one second RF signal through the second RF path using an RF circuit different from the first RF path in operation 545. In some cases, different RF paths may share the other hardware than the antenna. According to various embodiments, the electronic device 101 may control the electronic device 101 to provide the second RF signal using the second RF path having at least one different RF path than the first RF path. As described above, it is possible to prevent or reduce the heat generation state of one RF path from worsening due to continuous use of one RF path by changing the RF paths for processing the RF signal. Meanwhile, according to various embodiments, it will be appreciated by one of ordinary skill in the art that using the RF circuit and/or changing the RF circuit may be replaced with using the RF path and/or changing the RF path.

Figure 6A:
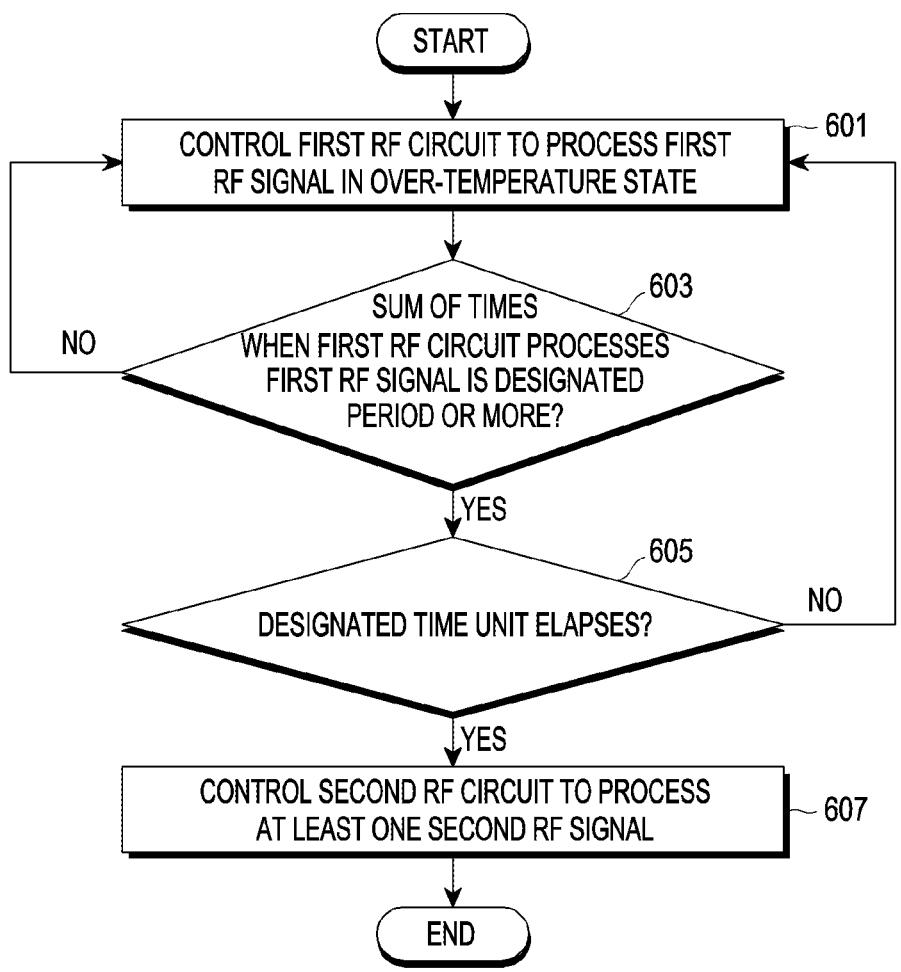
FIG. 6A illustrates a method for operating an electronic device according to various embodiments.
Figure 6B:
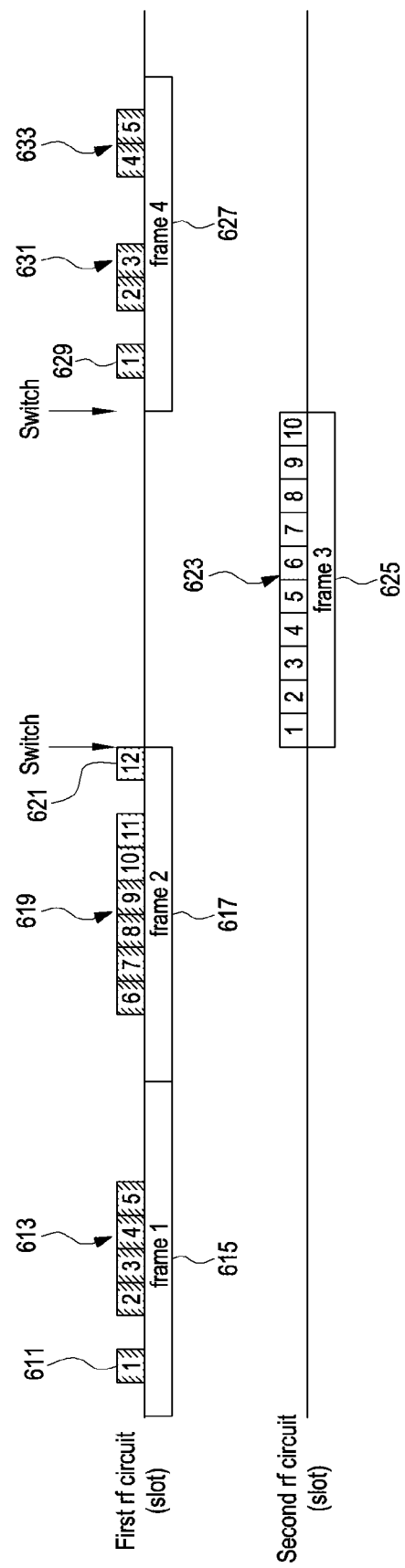
FIG. 6B is a view illustrating switching RF circuits according to various embodiments.

FIG. 6A illustrates a method for operating an electronic device according to various embodiments. The embodiment of FIG. 6A is described with reference to FIG. 6B. FIG. 6B is a view illustrating switching RF circuits according to various embodiments.

According to various embodiments, the electronic device 101 (e.g., the communication processor 301) may control the electronic device 101 to allow the first RF circuit 305 to process the first RF signal in an over-temperature state in operation 601. Controlling the first RF circuit 305 to process at least one first RF signal has been described above in connection with FIG. 5A, and thus, no repetitive description thereof is given. In operation 603, the electronic device 101 may identify whether the sum of times when the first RF circuit 305 has processed the first RF signal is a designated period or more. If the sum of the times when the first RF circuit 305 has processed the first RF signal is less than the designated period (No in 603), the electronic device 101 may keep controlling the first RF circuit 305 to process the first RF signal. If the sum of the times when the first RF circuit 305 has processed the first RF signal is the designated period or more (Yes in 603), the electronic device 101 may identify whether a designated time unit elapses in operation 605. If the designated time unit does not elapse (No in 605), the electronic device 101 may keep controlling the first RF circuit 305 to process the first RF signal. Unless the designated time unit elapses (Yes in 605), the electronic device 101 may control the electronic device 101 to allow the second RF circuit 309 to process at least one second RF signal in operation 607.

For example, referring to FIG. 6B, the electronic device 101 may control the first RF circuit 305 to process the first RF signal during a first period 611 (e.g., a 1-1th slot). In the embodiment of FIG. 6B, it is assumed that the period is one frame, but the period is not limited. For example, the period may be set to a period determined by the network which is described below. Since the sum, e.g., 1 slot, of the times when the first RF circuit 305 processes the at least one first RF signal is less than the period, 1 frame, the electronic device 101 may maintain the RF signal processing by the first RF circuit 305. As no transmission data exists or transmission of an uplink signal is not allowed during the 1-2th slot, the first RF circuit 305 may not process the RF signal either. The electronic device 101 may control the first RF circuit 305 to process the first RF signal during the second period 613 (e.g., a 1-3th slot to a 1-6th slot). Since the sum, e.g., 1+4=5 slots, of the times when the first RF circuit 305 processes the at least one first RF signal is less than the period, 1 frame, the electronic device 101 may maintain the RF signal processing by the first RF circuit 305. As no transmission data exists or transmission of an uplink signal is not allowed during the 1-7th slot to 1-10th slot, the first RF circuit 305 may not process the RF signal either. Meanwhile, as the 1-10th slot elapses, the electronic device 101 may enter from the first frame 615 to the second frame 617. In this case, the electronic device 101 may update the timer for determining whether the designated time unit (e.g., frame) determined in operation 605 has elapsed. As no transmission data exists or transmission of an uplink signal is not allowed during the 2-1th slot to 2-2th slot, the first RF circuit 305 may not process the RF signal either. The electronic device 101 may control the first RF circuit 305 to process the first RF signal during the third period 619 (e.g., a 2-3th slot to a 2-8th slot). Since the sum, e.g., 1+4+6=10 slots, of the times when the first RF circuit 305 processes the at least one first RF signal is the period, 1 frame, or more, the electronic device 101 may determine whether the designated time unit (e.g., frame) in operation 605 elapses. The electronic device 101 may identify that the second frame 617 has not elapsed during the 2-8th slot. Accordingly, the electronic device 101 may keep the first RF circuit 305 processing the first RF signal. The electronic device 101 may control the electronic device 101 to allow the first RF circuit 305 to process the first RF signal during the fourth period 621 (e.g., a 2-10th slot). Based on the sum, e.g., 1+4+6+1=11 slots, of the times when the first RF circuit 305 processes the at least one first RF signal in the 2-10th slot being the period, 1 frame, or more, the electronic device 101 may determine whether the designated time unit (e.g., frame) in operation 605 elapses. The electronic device 101 may identify that the second frame 617 elapses during the 2-10th slot. As the frame, which is the designated time unit, elapses, the electronic device 101 may switch the RF circuit for processing RF signals to the second RF circuit 309. As the RF circuit is switched, the sum of use times of the RF circuit (e.g., the first RF circuit 305) before switching may be reset to 0. As another example, according to the switching of the RF circuit, the sum of use times of the RF circuit (e.g., the first RF circuit 305) before switching may be reset to a value which is the existing sum less a designated value (e.g., 10 seconds), and the resetting scheme is not limited. Meanwhile, as the 2-10th slot elapses, the electronic device 101 may enter from the second frame 617 to the third frame 625. The designated time unit may also be reset according to entry into the third frame 625. The second RF circuit 309 may process at least one second RF signal during the fifth period 623 (e.g., a 3-1th slot to a 3-10th slot). Based on the sum, e.g., 10 slots, of the times when the second RF circuit 309 processes the at least one first RF signal in the 3-10th slot being the period, 1 frame, or more, the electronic device 101 may determine whether the designated time unit (e.g., frame) in operation 605 elapses. The electronic device 101 may identify that the third frame 625 elapses during the 3-10th slot. As the frame, which is the designated time unit, elapses, the electronic device 101 may switch the RF circuit for processing RF signals to the first RF circuit 305. As the RF circuit is switched, the sum of use times of the RF circuit (e.g., the second RF circuit 309) before switching may be reset to 0. Meanwhile, as the 3-10th slot elapses, the electronic device 101 may enter from the third frame 625 to the fourth frame 627. The designated time unit may also be reset according to entry into the fourth frame 627. The first RF circuit 305 may process at least one third RF signal during the sixth period 629, seventh period 631, and eighth period 633. Here, it will be understood by one of ordinary skill in the art that the ordinal number designating the RF signal may be assigned simply according to order of time. As described above, the RF circuit may be switched when a set time period (e.g., frame) is switched by the network.

Figure 7:
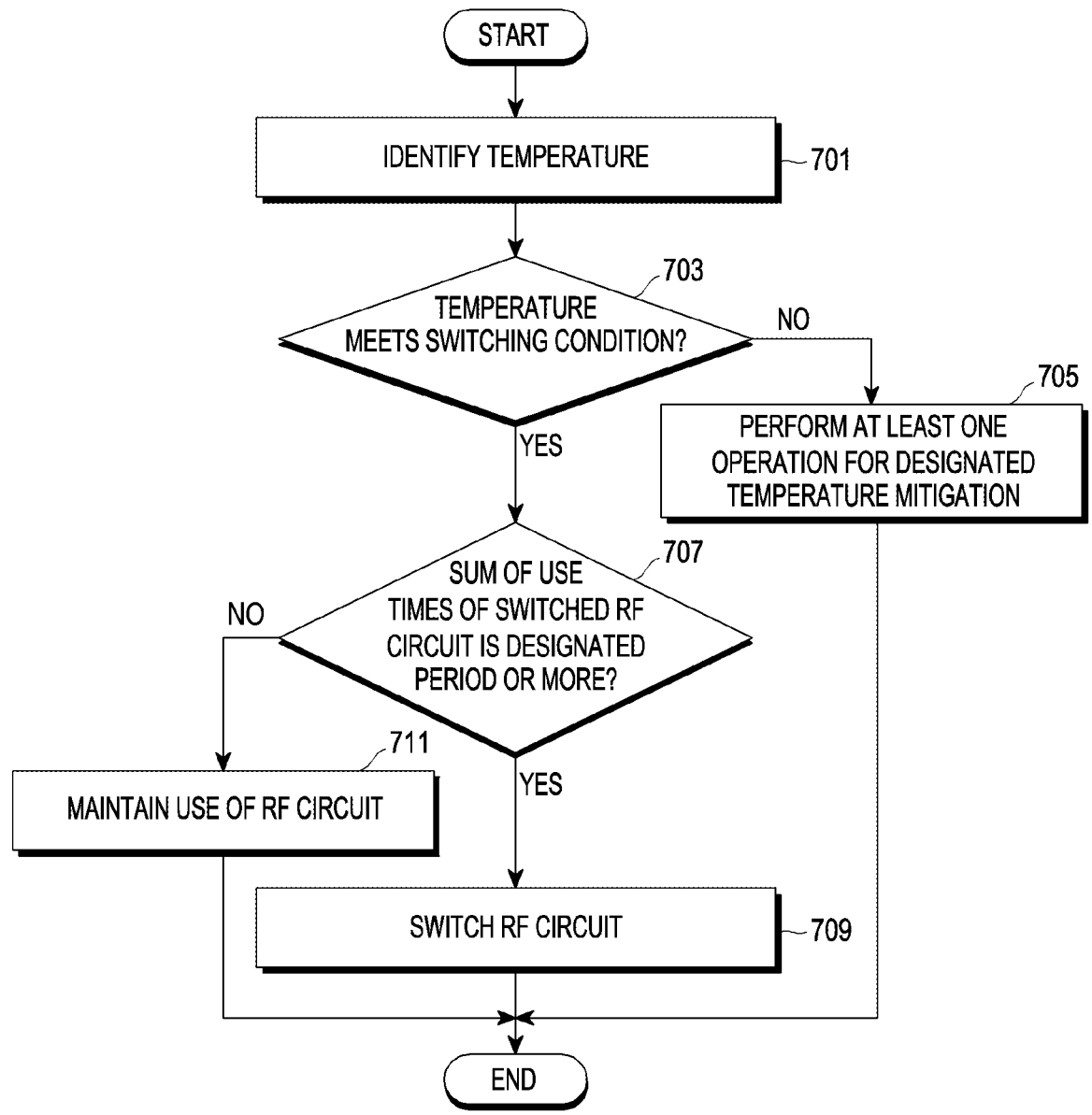
FIG. 7 illustrates a method for operating an electronic device according to various embodiments.

FIG. 7 illustrates a method for operating an electronic device according to various embodiments.

According to various embodiments, the electronic device 101 (e.g., the communication processor 301) may identify temperature in operation 701. As described above, the electronic device 101 may identify the temperature from one temperature sensor or identify a value (e.g., average or maximum value) based at least on the temperatures identified from a plurality of temperature sensors (which include, but are not limited to, at least one of the temperature of the AP, the temperature of the battery, USB temperature, the temperature of the outside or inside of the power amplifier (PA), the temperature of the Wi-Fi module, or the temperature of the display module). In operation 703, the electronic device 101 may identify whether the identified temperature meets a switching condition. For example, whether the identified temperature is a first over-temperature level or less may be identified as whether the switching condition is met. Meanwhile, the switching condition may also be implemented as whether the identified temperature is the first over-temperature level or more, but is not limited. If the switching condition is identified as being not met (No in 703), the electronic device 101 may perform at least one operation for designated temperature mitigation in operation 705. For example, the electronic device 101 may perform at least one of releasing SCell, stopping service, uplink throttling, maximum transmission power limit (MTPL) backoff duty cycling, heat generation mitigation operation corresponding to CPU, heat generation mitigation operation corresponding to GPU, brightness adjustment of the display module 160, system fallback, or RAT fallback, as the at least one operation for designated temperature mitigation, but is not limited in type. If the switching condition is identified as being met (Yes in 703), the electronic device 101 may identify whether the use time of the switched RF circuit, e.g., the sum of times of having processed the RF signal, is a designated period or more in operation 707. If the sum of times of use of the switched RF circuit is the designated period or more (Yes in 707), the electronic device 101 may switch the RF circuit for processing RF signals in operation 709. If the sum of times of use of the switched RF circuit is less than the designated period (No in 707), the electronic device 101 may maintain use of the RF circuit in operation 711.

Figure 8A:
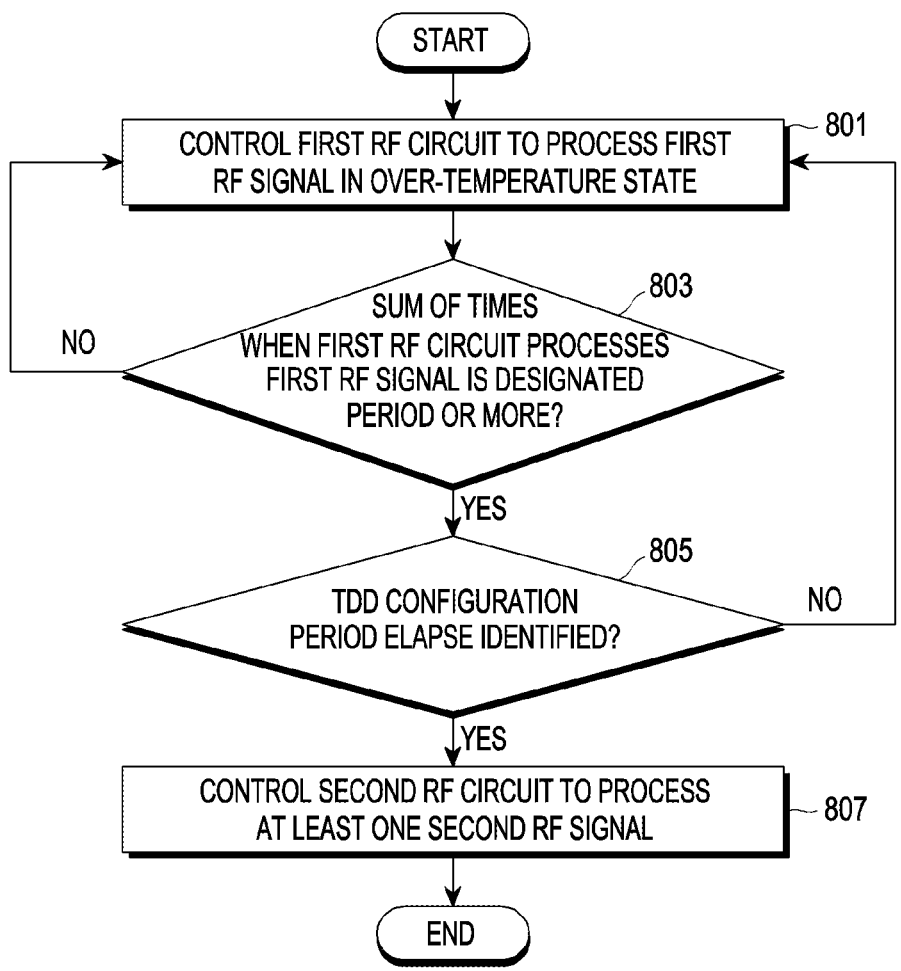
FIG. 8A illustrates a method for operating an electronic device according to various embodiments.
Figure 8B:
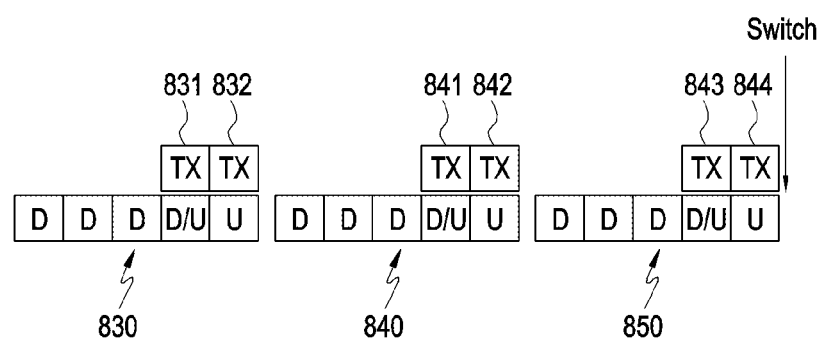
FIG. 8B is a view illustrating switching RF circuits according to various embodiments.

FIG. 8A illustrates a method for operating an electronic device according to various embodiments. The embodiment of FIG. 8A is described with reference to FIG. 8B. FIG. 8B is a view illustrating switching RF circuits according to various embodiments.

According to various embodiments, the electronic device 101 (e.g., the communication processor 301) may control the electronic device 101 to allow the first RF circuit 305 to process the first RF signal in an over-temperature state in operation 801. Controlling the first RF circuit 305 to process at least one first RF signal has been described above in connection with FIG. 5A, and thus, no repetitive description thereof is given. In operation 803, the electronic device 101 may identify whether the sum of times when the first RF circuit 305 has processed the first RF signal is a designated period or more. If the sum of the times when the first RF circuit 305 has processed the first RF signal is less than the designated period (No in 803), the electronic device 101 may keep controlling the first RF circuit 305 to process the first RF signal. If the sum of the times when the first RF circuit 305 has processed the first RF signal is the designated period or more (Yes in 803), the electronic device 101 may identify whether a TDD configuration period elapses in operation 805. For example, the electronic device 101 may receive an RRC reconfiguration message (e.g., RRC reconfiguration message or RRC connection reconfiguration message) from the network. The electronic device 101 may identify a time division-uplink-downlink configuration based on time division-uplink-downlink-configuration information (e.g., tdd-UL-DL-ConfigurationCommon IE) included in the RRC reconfiguration message. Table 1 shows an example of time division-uplink-downlink-configuration information according to various examples.

TABLE 1

Tdd-UL-DL-ConfigurationCommon
{
  referenceSubcarrierSpacing kHz30,
  pattern1
  {
    dl-UL-TransmissionPeriodicity ms2p5,
    nrofDownlinkSlots 3,
    nrofDownlinkSymbols 10,
    nrofUplinkSlots 1,
    nrofUPlinkSymbols 2
  },
  pattern2
  {
    dl-UL-TransmissionPeriodicity ms2p5,
    nrofDownlinkSlots 2,
    nrofDownlinkSymbols 10,
    nrofUplinkSlots 2,
    nrofUPlinkSymbols 2
  }
}.

The example in Table 1 may be information in the RRC reconfiguration message when the network instructs to alternately use Pattern 1 and Pattern 2. Pattern 1 may indicate that the period is 2.5 ms, the number of slots and the number of symbols corresponding to downlink are 3 slots and 10 symbols, respectively, and the number of slots and the number of symbols corresponding to uplink are 1 slot and 2 symbols, respectively, and in this case, the guard period may be 2 symbols. Pattern 2 may indicate that the period is 2.5 ms, the number of slots and the number of symbols corresponding to downlink are 2 slots and 10 symbols, respectively, and the number of slots and the number of symbols corresponding to uplink are 2 slots and 2 symbols, respectively, and in this case, the guard period may be 2 symbols. Table 2 shows an example of various patterns.

TABLE 2

| D | D | D | D/U | U |
|---|---|---|-----|---|

In Table 2, slot "D" may mean that all the symbols in the slot are symbols for downlink (e.g., slot format is 0). Slot "U" may mean that all the symbols in the slot are symbols for uplink (e.g., slot format is 1). Slot "D/U" may mean that the symbol for downlink and the symbol for uplink are mixed in the slot (e.g., slot format is a value other than 0 or 1). For example, in the embodiment of FIG. 8B, it is assumed that Pattern of Table 2 is repeated.

If the time division configuration period has not elapsed (No in 805), the electronic device 101 may maintain the control for the first RF circuit 305 to process the first RF signal. If the time division configuration period elapses (Yes in 805), the electronic device 101 may control the electronic device 101 to allow the second RF circuit 309 to process at least one second RF signal in operation 807. For example, referring to FIG. 8B, the electronic device 101 may determine to allocate slots D, D, D, D/U, and D to the first time division configuration period 830, the second time division configuration period 840, and the third time division configuration period 850, and the scheme of allocating the slot is not limited. The electronic device 101 may control the first RF circuit 305 to process the first RF signal during the first period 831. For example, the electronic device 101 may transmit the RF signal during U slot and D/U slot. Meanwhile, in the embodiment of FIG. 8B, the RF signal is processed and transmitted in all D slots and D/U slots, but this is exemplary, and the RF signal may not be processed or transmitted in some slots of D slots and slots D/U. In this case, it has been described above that the electronic device 101 may count only the periods during which the RF signal is actually processed or transmitted. In the embodiment of FIG. 8B, the switching period is assumed to be 5 slots. Since the sum, e.g., 1 slot, of the times when the first RF circuit 305 has processed the first RF signal is less than the switching period, five slots, the electronic device 101 may maintain RF signal processing by the first RF circuit 305. Meanwhile, the first RF circuit 305 may not process the RF signal in slots of downlink. The electronic device 101 may control the first RF circuit 305 to process the first RF signal during the second period 832. Since the sum, e.g., 1+1=2 slots, of the times when the first RF circuit 305 has processed the first RF signal is less than the period, 5 slots, the electronic device 101 may maintain RF signal processing by the first RF circuit 305. Meanwhile, the electronic device 101 may then enter the second time division configuration period 840. In this case, the electronic device 101 may update the timer for determining whether the time division configuration period determined in operation 805 has elapsed. Meanwhile, the electronic device 101 may also control the first RF circuit 305 to process the first RF signal during the periods 841 and 842 of the second time division configuration period 840. Since the sum, e.g., 4 slots, of the times when the first RF circuit 305 has processed the first RF signal is less than the period, 5 slots, the electronic device 101 may maintain RF signal processing by the first RF circuit 305. Meanwhile, the electronic device 101 may then enter the third time division configuration period 850. The electronic device 101 may control the first RF circuit 305 to process the first RF signal during the fifth period 843. Based on the sum, e.g., 5 slots, of the times when the first RF circuit 305 has processed the first RF signal in the fifth period 843, the electronic device 101 may determine whether the designated time unit (e.g., the period set by the network) in operation 805 has elapsed. The electronic device 101 may identify that the second time division configuration period 840 has not elapsed. Accordingly, the electronic device 101 may keep the first RF circuit 305 processing the first RF signal. The electronic device 101 may control the electronic device 101 to allow the first RF circuit 305 to process the first RF signal during the sixth period 844. Based on the sum, e.g., 6 slots, of the times when the first RF circuit 305 has processed the first RF signal in the sixth period 844 being the period, 5 slots, or more, the electronic device 101 may determine whether the time division configuration period in operation 805 elapses. The electronic device 101 may identify that the third time division configuration period 850 elapses. As the time division configuration period elapses, the electronic device 101 may switch the RF circuit for processing RF signals to the second RF circuit 309. As the RF circuit is switched, the sum of use times of the RF circuit (e.g., the first RF circuit 305) before switching may be reset to 0, and the time division configuration period may also be reset. The second RF circuit 309 309 may process at least one second RF signal after the third time division configuration period 850. According to the foregoing description, the RF circuit may be switched at the time of the time division configuration period change time synchronized with the network.

The example of Table 1 is an embodiment showing information in the RRC reconfiguration message when the network instructs to alternately use Pattern 1 and Pattern 2, but it is not excluded to configure only one of Pattern 1 and Pattern 2, and it will be appreciated by one of ordinary skill in the art that the configuration of the pattern is not limited.

Figure 9:
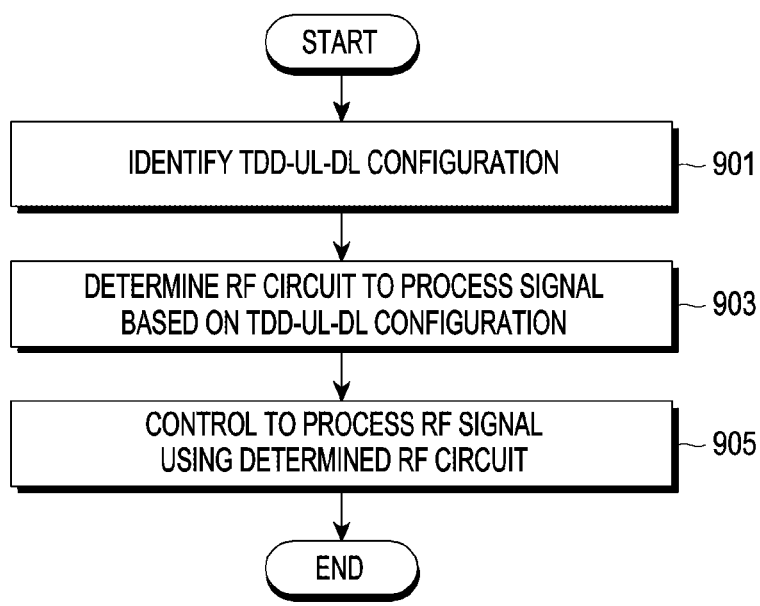
FIG. 9 illustrates a method for operating an electronic device according to various embodiments.
Figure 10A:
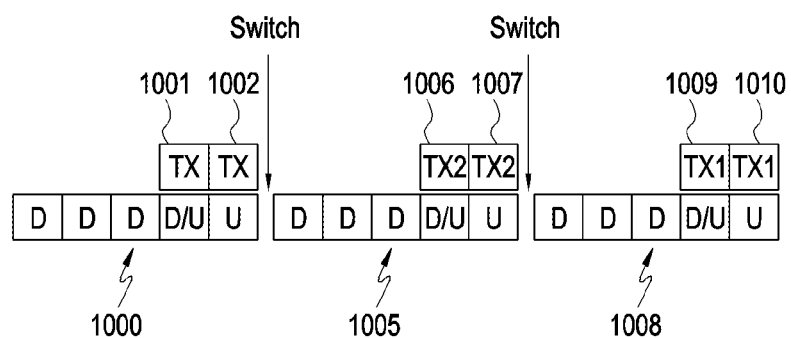
FIGS. 10A to 10C are views illustrating switching RF circuits according to various embodiments.
Figure 10B:
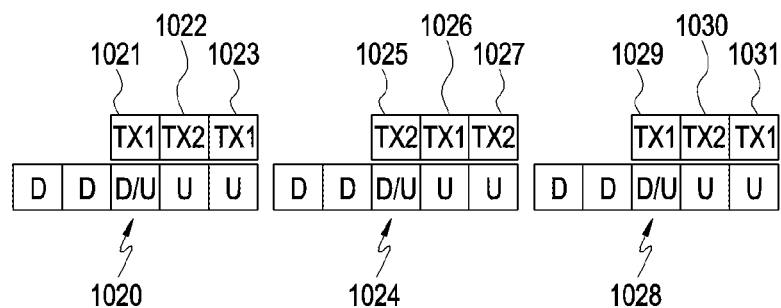
Figure 10C:
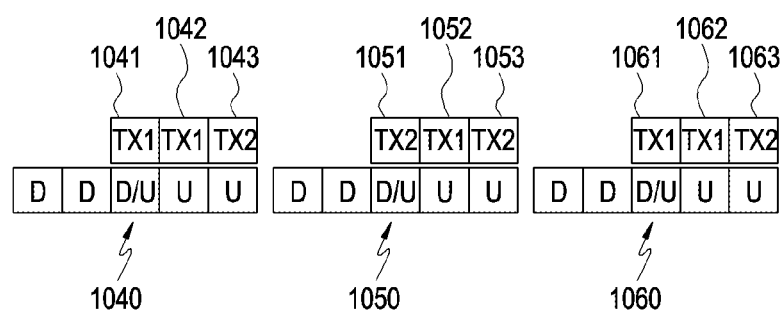

FIG. 9 illustrates a method for operating an electronic device according to various embodiments. The embodiment of FIG. 9 is described with reference to FIGS. 10A to 10C. FIGS. 10A to 10C are views illustrating switching RF circuits according to various embodiments.

According to various embodiments, the electronic device 101 (e.g., the communication processor 301) may identify the time division-uplink-downlink configuration in operation 901. As described above, the electronic device 101 may identify the time division-uplink-downlink (TDD-UL-DL) configuration based on the RRC reconfiguration message from the network. In operation 903, the electronic device 101 may determine the RF circuit to process the RF signal based at least on the time division-uplink-downlink configuration. In operation 905, the electronic device 101 may control the electronic device 101 to process the RF signal using the determined RF circuit.

For example, in the embodiment of FIG. 10A, the electronic device 101 may control the electronic device 101 to allow the first RF circuit 305 to process the RF signal during a first period 1001 and a second period 1002 of the first time division configuration period 1000. The electronic device 101 may control the electronic device 101 to allow the second RF circuit 309 to process the RF signal during a first period 1006 and a second period 1007 of the second time division configuration period 1005. The electronic device 101 may control the electronic device 101 to allow the first RF circuit 305 to process the RF signal during a first period 1009 and a second period 1010 of the third time division configuration period 1008.

For example, in the embodiment of FIG. 10B, the electronic device 101 may control the electronic device 101 to allow the first RF circuit 305 to process the RF signal during a first period 1021 corresponding to D/U slot of the first time division configuration period 1020. The electronic device 101 may control the electronic device 101 to allow the second RF circuit 309 to process the RF signal during a second period 1022 corresponding to U slot of the first time division configuration period 1020. The electronic device 101 may control the electronic device 101 to allow the first RF circuit 305 to again process the RF signal during a third period 1023 corresponding to U slot of the first time division configuration period 1020. For example, in the embodiment of FIG. 10B, the electronic device 101 may perform RF circuit switching in the slot period for D/U slot and U slot in the downlink-uplink-configuration. As the RF circuit switching is performed in one slot period, the first RF circuit 305 may process the RF signal during each of the first period 1021, the third period 1023, and the fifth period 1026 of the second time division configuration period 1024, the seventh period 1029, and the ninth period 1031 of the third time division configuration period 1028, and the second RF circuit 309 may process the RF signal during each of the second period 1022, the fourth period 1025, the sixth period 1027, and the eighth period 1030. Meanwhile, the above-described switching period being one slot is merely an example, and the number of slots is not limited. The electronic device 101 may be configured to switch the RF circuit in a designated period for all of D/U slots and U slots (or all of D/U slots and U slots for actual RF signal processing).

For example, in the embodiment of FIG. 10C, the electronic device 101 may control the electronic device 101 to allow the first RF circuit 305 to process the RF signal during the first period 1041 corresponding to D/U slot of the first time division configuration period 1040. The electronic device 101 may control the electronic device 101 to allow the second RF circuit 309 to process the RF signal during the second period 1051 of the second time division configuration period 1050 corresponding to the next D/U slot of the first time division configuration period 1040. The electronic device 101 may control the electronic device 101 to allow the first RF circuit 305 to process the RF signal during the third period 1061 of the third time division configuration period 1060 corresponding to the next D/U slot of the second time division configuration period 1050. The electronic device 101 may switch the RF circuit in the period of one slot for the slots D/U. Meanwhile, the electronic device 101 may switch the RF circuit in the period of one slot for the periods 1042, 1043, 1052, 1053, 1062, and 1063 corresponding to the U slots. Accordingly, the first RF circuit 305 may process the RF signal during each of the periods 1042, 1052, and 1062, and the second RF circuit 309 may process the RF signal during each of the periods 1043, 1053, and 1063. As described above, the electronic device 101 may switch the RF circuit independently for each type of slot. Meanwhile, the electronic device 101 may perform switching in units of symbols, and it will be understood by one of ordinary skill in the art that when the flexible (F) symbol is also determined as the uplink, it may be processed in substantially the same manner as the slot for the uplink of FIGS. 10A to 10C.

Figure 11:
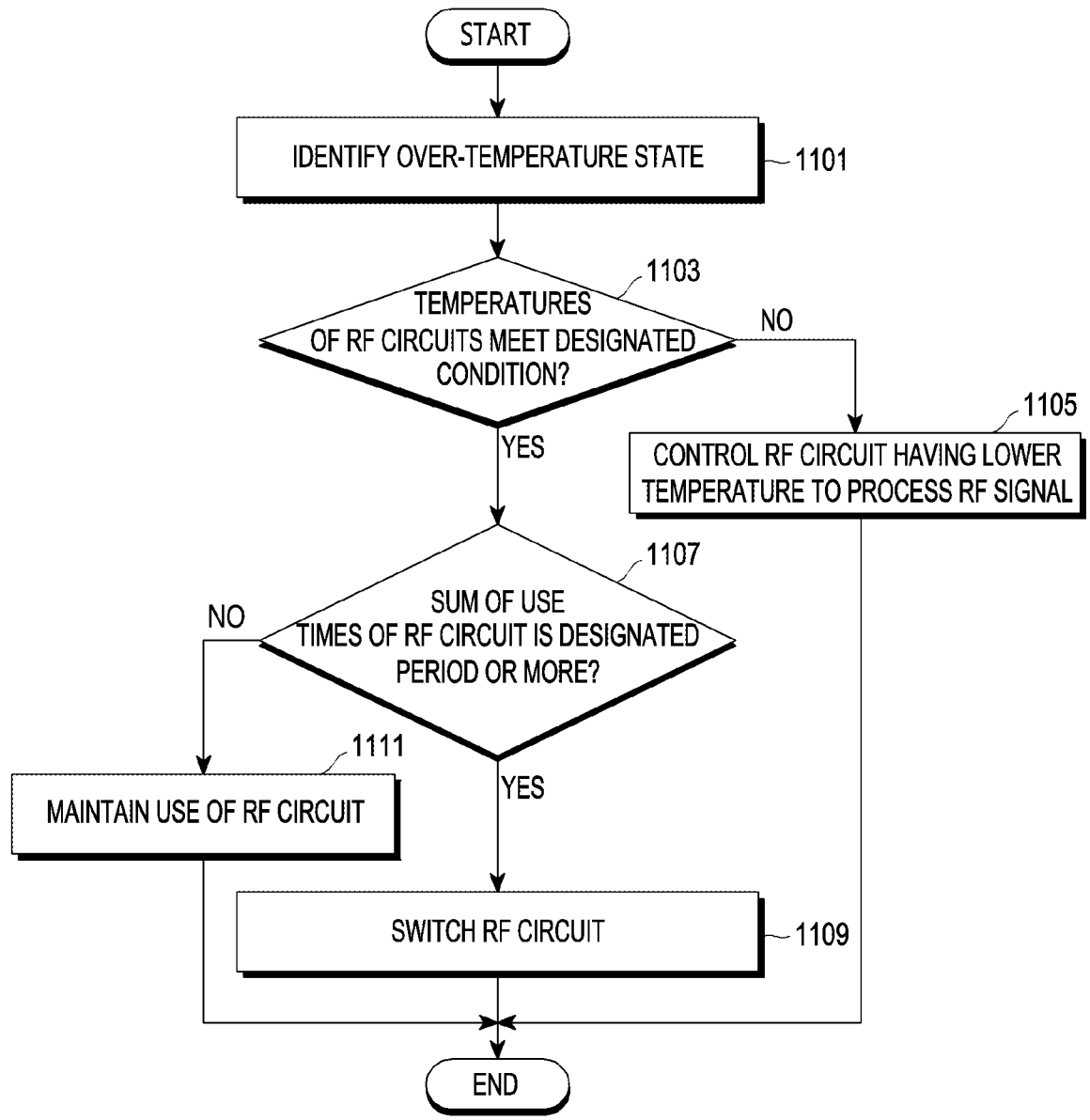
FIG. 11 illustrates a method for operating an electronic device according to various embodiments.

FIG. 11 illustrates a method for operating an electronic device according to various embodiments.

According to various embodiments, the electronic device 101 (e.g., the communication processor 301) may identify an over-temperature state in operation 1101. The electronic device 101 may identify whether the temperatures of the RF circuits meet a designated condition in operation 1103. For example, the electronic device 101 may identify whether a first temperature corresponding to any one RF circuit is a threshold or more higher than a second temperature corresponding to another RF circuit as whether the designated condition is met. Meanwhile, the above-described example is merely an example, and whether the first temperature corresponding to any one RF circuit is the threshold or more lower than the second temperature corresponding to the other RF circuit may be identified as whether the designated condition is met, but may be of any type without limitations. When the designated condition is not met (No in 1103), the electronic device 101 may control the electronic device 101 to allow the RF circuit having the lower temperature to process the RF signal in operation 1105. If the designated condition is met (Yes in 1103), the electronic device 101 may identify that the sum of use times of the current RF circuit (e.g., RF signal processing time) is a designated period or more in operation 1107. When the sum of use times of the current RF circuit (e.g., RF signal processing time) is the designated period or more (Yes in 1107), the electronic device 101 may switch the RF circuit in operation 1109. When the sum of use times of the current RF circuit (e.g., RF signal processing time) is less than the designated period (No in 1107), the electronic device 101 may maintain use of the current RF circuit in operation 1111. For example, when the difference in temperature between the RF circuits is relatively large, the electronic device 101 may perform the operation of switching RF circuits and, when the difference in temperature is relatively small, the electronic device 101 may use the RF circuit corresponding to the lower temperature. Meanwhile, this is merely an example and, in another example, the electronic device 101 may also be implemented to perform the operation of switching RF circuits when the difference in temperature between the RF circuits is relatively small and use the RF circuit corresponding to the lower temperature when the difference in temperature is relatively large.

Figure 12:
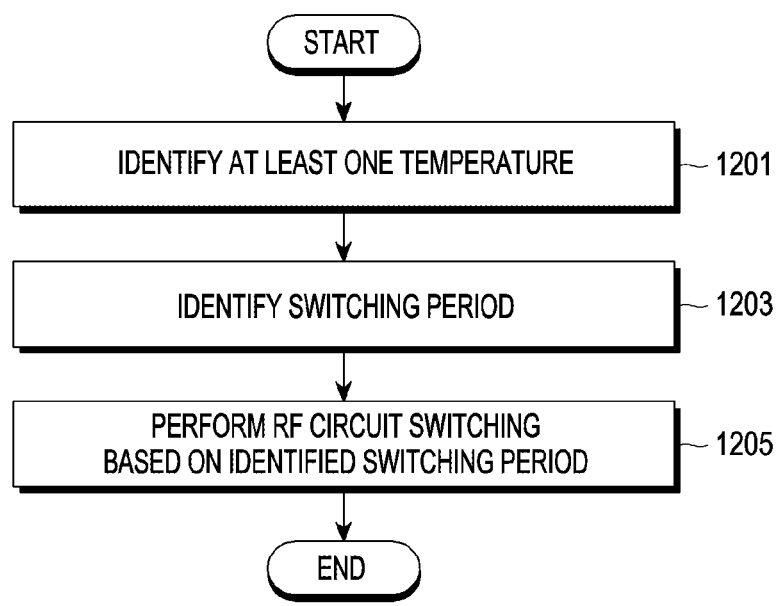
FIG. 12 illustrates a method for operating an electronic device according to various embodiments.

FIG. 12 illustrates a method for operating an electronic device according to various embodiments.

According to various embodiments, the electronic device 101 (e.g., the communication processor 301) may identify at least one temperature in operation 1201. In operation 1203, the electronic device 101 may identify the switching period based on the identified at least one temperature. For example, the electronic device 101 may store association information between at least one temperature and switching period and identify the switching period using the identified at least one temperature and the association information. Or, the electronic device 101 may calculate the switching period by applying the identified at least one temperature to a designated formula. In one example, the electronic device 101 may identify a relatively large switching period corresponding to a relatively low temperature and a relatively small switching period corresponding to a relatively high temperature, but this is merely an example, without limitations. The electronic device 101 may switch RF circuits based on the identified switching period in operation 1205.

Figure 13:
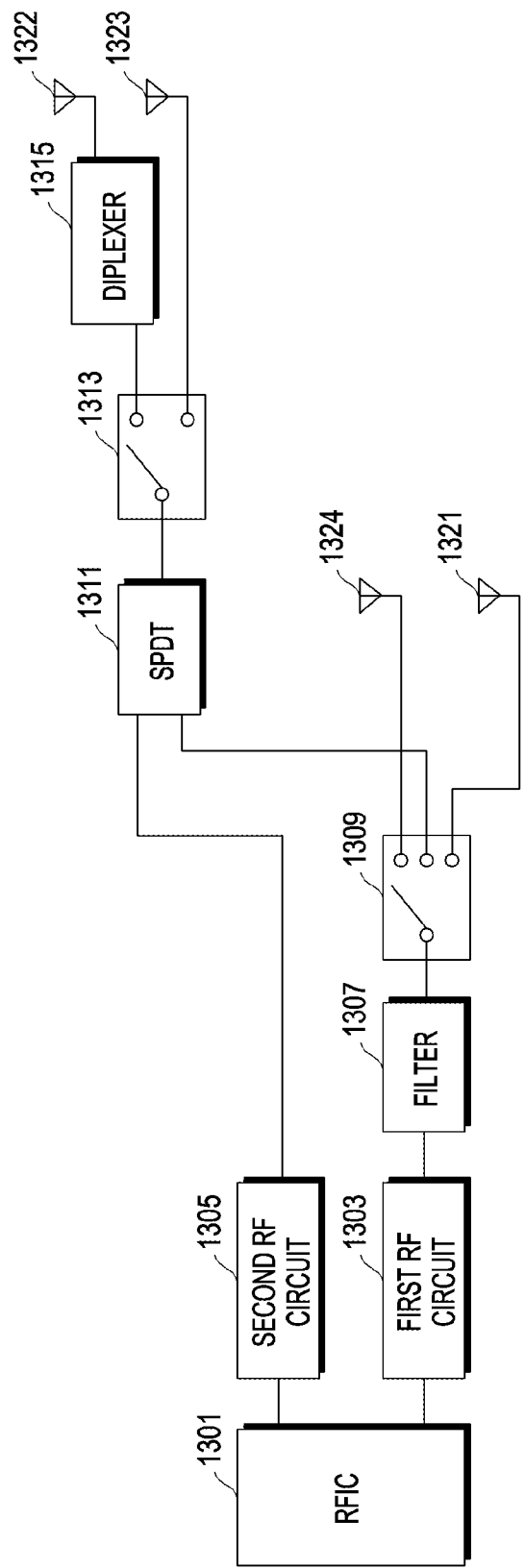
FIG. 13 is a block diagram illustrating an electronic device according to various embodiments.

FIG. 13 is a block diagram illustrating an electronic device according to various embodiments.

According to various embodiments, an electronic device 101 may include at least one of an RFIC 1301, a first RF circuit 1303, a second RF circuit 1305, a filter 1307, a first switch 1309, an SPDT 1311, a second switch 1313, a diplexer 1315, a first antenna 1321, a second antenna 1322, a third antenna 1323, or a fourth antenna 1324. Although not shown, the communication processor 301 of the electronic device 101 may be connected to the RFIC 1301. In the embodiment of FIG. 13, the first RF circuit 1303 may support 1t4r. For example, the first RF circuit 1303 may transmit other RF signals than sounding reference signals (SRSs) through the second antenna 1322 or may transmit one of the SRSs. In this case, the first switch 1309 may be controlled to connect the filter 1307 to the SPDT 1311, and the second switch 1313 may be controlled to connect the SPDT 1311 to the diplexer 1315. Meanwhile, the electronic device 101 may transmit an SRS through each of the four antennas 1321, 1322, 1323, and 1324 according to the SRS configuration of 1t4r. The electronic device 101 may transmit one of the four SRSs through the second antenna 1322.

The transmission time and/or duration of the SRS may be identified based on, e.g., information (e.g., srs-ResourceToAddModList) in the RRC reconfiguration message from the network, but the identification method is not limited. For example, the first RF circuit 1303 may transmit one of the SRSs through the first antenna 1321. In this case, the first switch 1309 may be controlled to connect the filter 1307 to the first antenna 1321. For example, the first RF circuit 1303 may transmit one of the SRSs through the third antenna 1323. In this case, the first switch 1309 may be controlled to connect the filter 1307 to the SPDT 1311, and the second switch 1313 may be controlled to connect the SPDT 1311 to the third antenna 1323. For example, the first RF circuit 1303 may transmit one of the SRSs through the fourth antenna 1324. In this case, the first switch 1309 may be controlled to connect the filter 1307 to the fourth antenna 1324.

Meanwhile, the second RF circuit 1305 may support 1t2r. For example, the second RF circuit 1305 may transmit other RF signals than SRSs through the second antenna 1322 or may transmit one of the SRSs. In this case, the first switch 1309 may be controlled to connect the filter 1307 to the SPDT 1311, and the second switch 1313 may be controlled to connect the SPDT 1311 to the diplexer 1315. The electronic device 101 may transmit one of the four SRSs through the second antenna 1322. For example, the first RF circuit 1303 may transmit one of the SRSs through the first antenna 1321. In this case, the first switch 1309 may be controlled to connect the filter 1307 to the first antenna 1321.

As described above, when the RF signal corresponding to the SRS is provided to the second antenna 1322, the RF signal may be processed (e.g., amplified) by the first RF circuit 1303 or be processed by the second RF circuit 1305. Alternatively, when the RF signal corresponding to the SRS is provided to the third antenna 1323, the RF signal may be processed (e.g., amplified) by the first RF circuit 1303 or be processed by the second RF circuit 1305. In the case of an overt-temperature state, the electronic device 101 may be operated to allow the first RF circuit 1303 and the second RF circuit 1305 to alternately process the RF signal corresponding to the SRS, which is described below.

Figure 14:
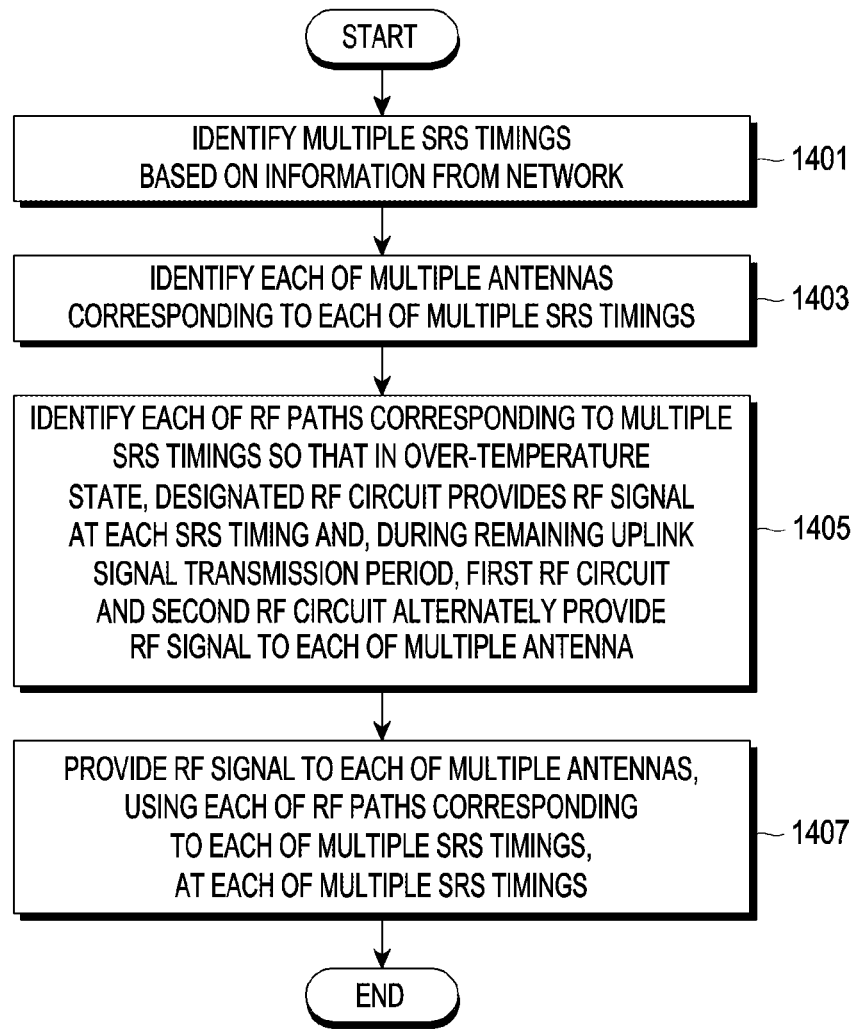
FIG. 14 is a flowchart illustrating a method for operating an electronic device according to various embodiments.

FIG. 14 is a flowchart illustrating a method for operating an electronic device according to various embodiments. The embodiment of FIG. 14 is described with reference to FIG. 15A. FIG. 15A illustrates an example of a time division-uplink-downlink configuration according to various embodiments.

According to various embodiments, the electronic device 101 (e.g., the communication processor 301) may identify a plurality of SRS timings based on information from the network in operation 1401. The electronic device 101 may identify each of the plurality of antennas respectively corresponding to the plurality of SRS timings in operation 1403. For example, when the electronic device 101 supports 1t4r as in FIG. 13, the electronic device 101 may identify each of the four antennas (e.g., the antennas 1321, 1322, 1323, and 1324 in FIG. 13). In operation 1405, the electronic device 101 may identify each of the RF paths corresponding to the plurality of SRS timings so that in the over-temperature state, at each of the plurality of SRS timings, a designated RF circuit (e.g., the first RF circuit 1303 of FIG. 13) provides the RF signal at each of the SRS timings and, during the remaining uplink signal transmission period, the first RF circuit (e.g., the first RF circuit 1303 of FIG. 13) and the second RF circuit (e.g., the second RF circuit 1305 of FIG. 13) alternately provide the RF signal to each of the plurality of antennas (e.g., the antennas 1321, 1322, 1323, and 1324 of FIG. 13). Here, the designated RF circuit may be, e.g., an RF circuit capable of providing the RF signal to all of the antennas 1321, 1322, 1323, and 1324, like the first RF circuit 1303 of FIG. 13, and be named a default RF circuit for convenience of description. In operation 1407, the electronic device 101 may provide the RF signal to each of the plurality of antennas through each of the RF paths corresponding to each of the plurality of SRS timings in operation 1407. For example, in the example of FIG. 15, the electronic device 101 may identify that it is configured by the network to transmit SRSs in the third U slot, the seventh U slot, the thirteenth U slot, and the seventeenth U slot. The electronic device 101 may identify the RF path using the default RF circuit with respect to the third U slot, the seventh U slot, the thirteenth U slot, and the seventeenth U slot. Accordingly, in the third U slot, the seventh U slot, the thirteenth U slot, and the seventeenth U slot, the default RF circuit (e.g., the first RF circuit 1303 of FIG. 13) may process the RF signal corresponding to the SRS. Meanwhile, during the remaining uplink signal transmission period (e.g., the remaining S slot and U slot), the electronic device 101 may allocate the RF circuits 1303 and 1305 to alternately process the RF signal, without limitations. Alternatively, since the default RF circuit is used at the SRS timing, the electronic device 101 may allocate other RF circuits to be used longer than the default RF circuit by the SRS transmission period in the remaining uplink signal transmission period. For example, in FIG. 15, since the first RF circuit 1303 which is the default RF circuit is used for the 4 slots of the third U slot, the seventh U slot, the thirteenth U slot, and the seventeenth U slot, the second RF circuit 1305 may be allocated to be used longer than the first RF circuit 1303 by four slots, in the remaining slots.

Figure 15B:
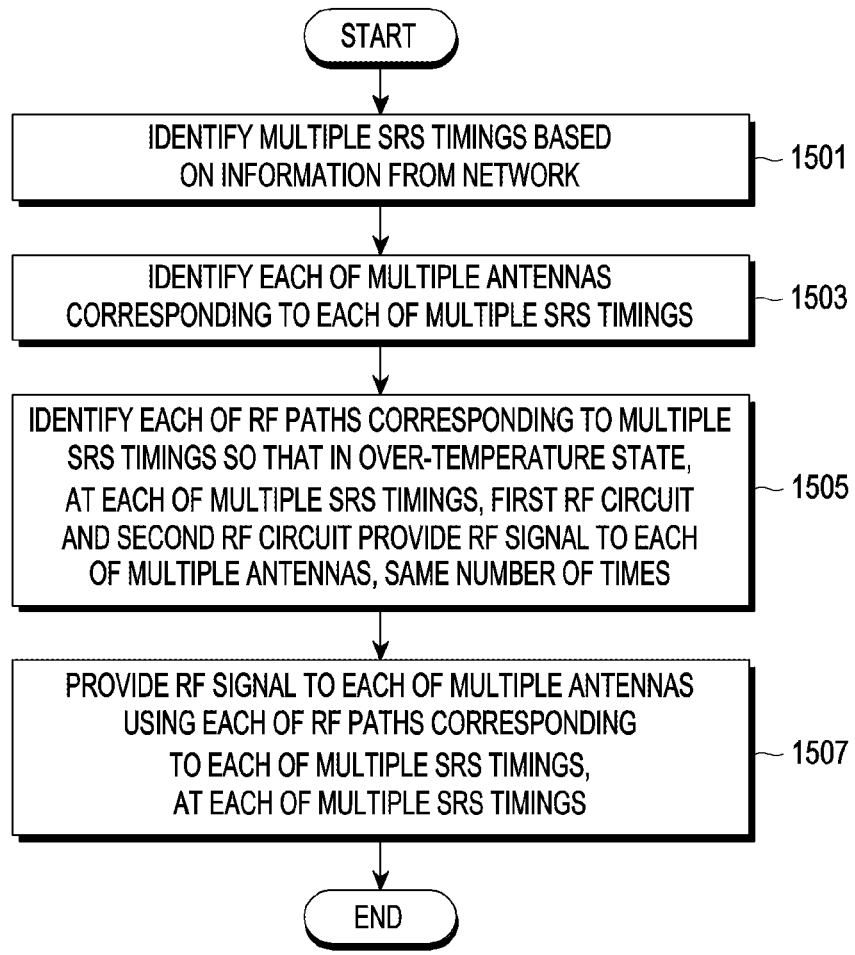
FIG. 15B is a flowchart illustrating a method for operating an electronic device according to various embodiments.

FIG. 15B is a flowchart illustrating a method for operating an electronic device according to various embodiments.

According to various embodiments, the electronic device 101 (e.g., the communication processor 301) may identify a plurality of SRS timings based on information from the network in operation 1501. The electronic device 101 may identify each of the plurality of antennas respectively corresponding to the plurality of SRS timings in operation 1503. In operation 1505, the electronic device 101 may identify each of the RF paths corresponding to the plurality of SRS timings so that in the over-temperature state, at each of the plurality of SRS timings, the first RF circuit (e.g., the first RF circuit 1303 of FIG. 13) and the second RF circuit (e.g., the second RF circuit 1305 of FIG. 13) provide the RF signal to each of the plurality of antennas (e.g., the antennas 1321, 1322, 1323, and 1324 of FIG. 13) the same number of times. For example, when the electronic device 101 applies the RF signal to the first antenna 1321, it is impossible to provide the RF signal by the second RF circuit 1305. Accordingly, the electronic device 101 may provide the RF signal to the first antenna 1321 by way of the first RF circuit 1303. For example, when the electronic device 101 applies the RF signal to the second antenna 1322, it is possible to provide the RF signal by the first RF circuit 1303 and the second RF circuit 1305 both, so that the electronic device 101 may provide the RF signal to the first antenna 1321 using the second RF circuit 1305. For example, when the electronic device 101 applies the RF signal to the third antenna 1323, it is possible to provide the RF signal by the first RF circuit 1303 and the second RF circuit 1305 both, so that the electronic device 101 may provide the RF signal to the first antenna 1321 using the second RF circuit 1305. For example, when the electronic device 101 applies the RF signal to the fourth antenna 1324, it is impossible to provide the RF signal by the second RF circuit 1305. Accordingly, the electronic device 101 may provide the RF signal to the first antenna 1321 by way of the first RF circuit 1303. As described above, the electronic device 101 may use the default RF circuit (e.g., the first RF circuit 1303 of FIG. 13) for the antennas (e.g., the first antenna 1321 and the fourth antenna 1324 of FIG. 13) to which the RF signal may be provided only by the default RF circuit and may use other RF circuits (e.g., the second RF circuit 1305 of FIG. 13) for the remaining antennas (e.g., the second antenna 1322 and the third antenna 1323 of FIG. 13). In operation 1507, the electronic device 101 may provide the RF signal to each of the plurality of antennas through each of the RF paths corresponding to each of the plurality of SRS timings in operation 1407. Meanwhile, during the remaining uplink signal transmission period (e.g., the remaining S slot and U slot), the electronic device 101 may allocate the RF circuits 1303 and 1305 to alternately process the RF signal, without limitations.

Figure 16:
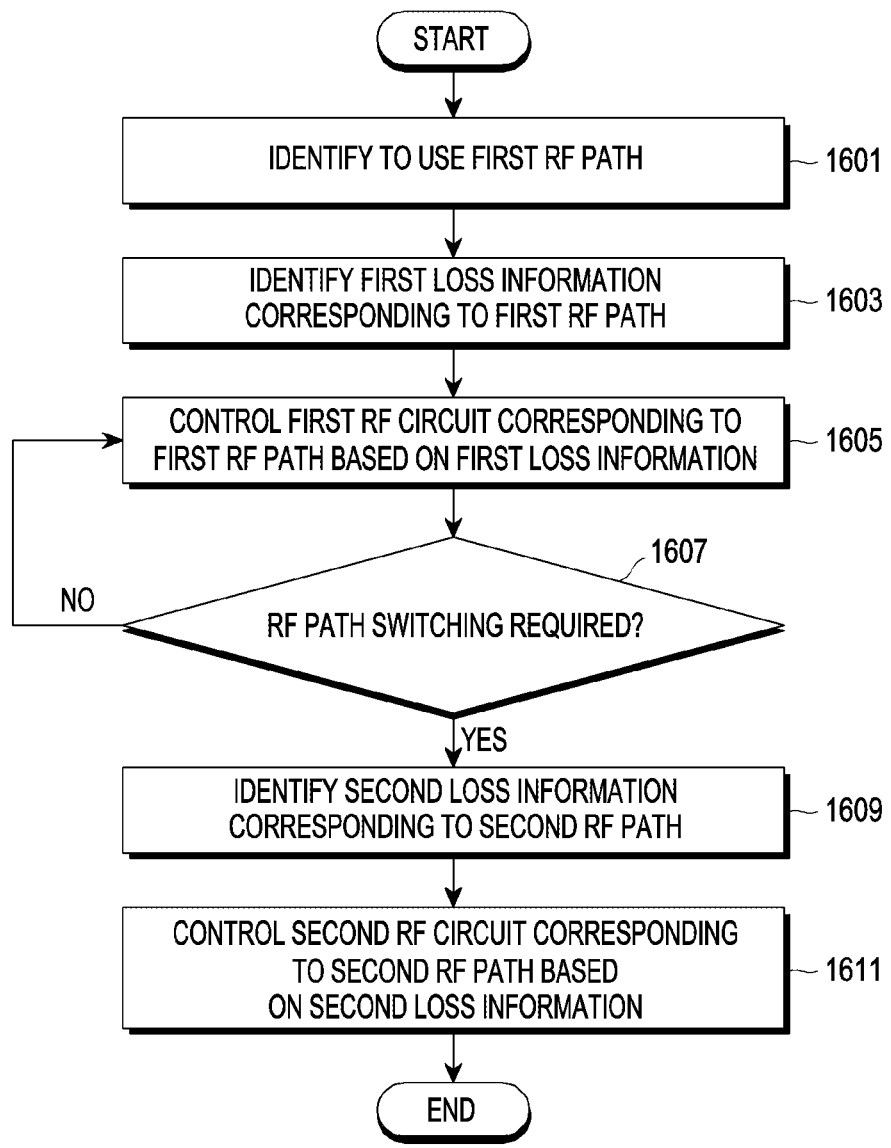
FIG. 16 is a flowchart illustrating a method for operating an electronic device according to various embodiments.

FIG. 16 is a flowchart illustrating a method for operating an electronic device according to various embodiments.

According to various embodiments, the electronic device 101 (e.g., the communication processor 301) may identify to use the first RF path in operation 1601. The electronic device 101 may identify first loss information corresponding to the first RF path in operation 1603. Here, the first loss information may include, e.g., a path loss and/or an antenna loss of the first RF path. For example, the first loss information may be an antenna loss of 2 dBi, but is not limited thereto. In operation 1605, the electronic device 101 may control the first RF circuit 305 corresponding to the first RF path based on the first loss information. For example, the electronic device 101 may control the degree of amplification of the first RF circuit 305 to output the RF signal having a target power of 23 dBm considering an antenna loss of 2 dBi. Meanwhile, it will be understood by one of ordinary skill in the art that additional amplification degree control may be performed considering the path loss. In operation 1607, the electronic device 101 may identify whether RF path switching is required. For example, the electronic device 101 may identify whether the sum of the use times of the first RF circuit 305 is equal to or larger than the switching period. If switching is not required (No in 1607), the electronic device 101 may maintain the provision of the RF signal using the first RF path. If switching is required (Yes in 1607), the electronic device 101 may identify second loss information corresponding to the second RF path in operation 1609. The electronic device 101 may control the second RF circuit 309 corresponding to the second RF path based on the second loss information in operation 1611. Here, the first loss information may include, e.g., a path loss and/or an antenna loss of the first RF path. For example, the second loss information may be an antenna loss of 3 dBi, but is not limited thereto. In operation 1611, the electronic device 101 may control the first RF circuit 305 corresponding to the first RF path based on the second loss information. For example, the electronic device 101 may control the degree of amplification of the second RF circuit 309 to output the RF signal having a target power of 24 dBm considering an antenna loss of 3 dBi. Meanwhile, it will be understood by one of ordinary skill in the art that additional amplification degree control may be performed considering the path loss. As described above, the electronic device 101 may control to output a target power that is larger by the value corresponding to the loss. For example, the difference between the target power and the output power input to the antenna port may be referred to as an offset. For example, in the above example, the offset of the first RF path may be 2 dB, and the offset of the second RF path may be 3 dB.

Figure 17:
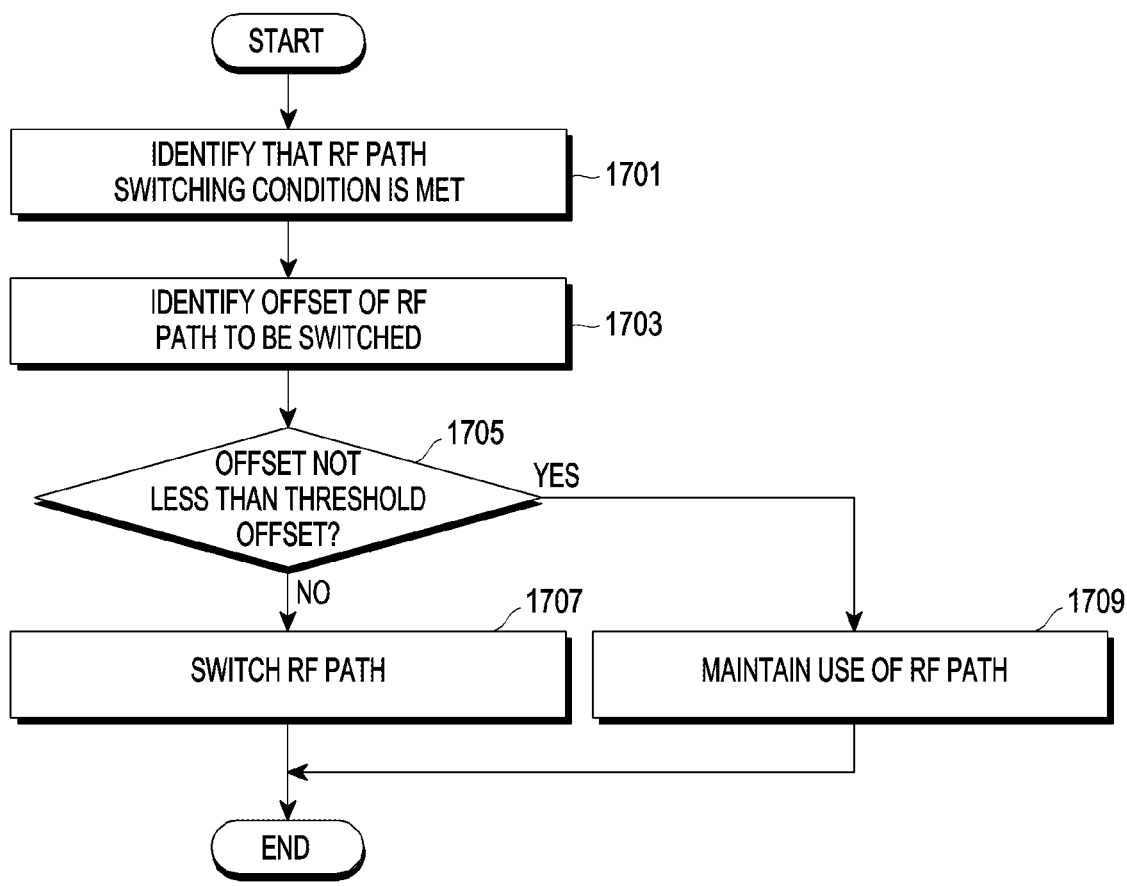
FIG. 17 is a flowchart illustrating a method for operating an electronic device according to various embodiments.

FIG. 17 is a flowchart illustrating a method for operating an electronic device according to various embodiments.

According to various embodiments, the electronic device 101 (e.g., the communication processor 301) may identify that the RF path switching condition is met in operation 1701. For example, the electronic device 101 may identify that the use time of the existing RF circuit is larger than or equal to the switching period. In operation 1703, the electronic device 101 may identify the offset of the RF path to be switched. In operation 1705, the electronic device 101 may identify whether the offset of the RF path to be switched is equal to or larger than a threshold offset. If the offset of the RF path to be switched is less than the threshold offset (No in 1705), the electronic device 101 may switch the RF path in operation 1707. If the offset of the RF path to be switched is equal to or larger than the threshold offset (Yes in 1705), the electronic device 101 may maintain the use of the existing RF path in operation 1709. A relatively large offset may mean that a relatively large degree of amplification needs to be performed by the RF circuit, leading to a chance of worsening the over-temperature state. The threshold offset is a value set to identify that the increase in temperature due to large amplification is large as compared with the reduction in temperature by RF circuit switching, and this value may be experimentally determined, but is not limited. The offset may be set based on at least one of the path loss (e.g., loss from the PA to the antenna port), antenna loss (loss caused by antenna performance), or difference in reception strength per antenna (e.g., at least one of RSRP, RSSI, or RSCP). Here, the path loss and the antenna loss may be fixed values, and the difference in reception strength per antenna may be a dynamic value. The difference in reception strength per antenna may be a difference that occurs due to, e.g., a grip event, and the difference being relatively large may mean that the communication environment of a specific antenna is relatively poor, and application of an RF signal to the antenna in a poor communication environment may worsen the over-temperature state. Accordingly, switching to the RF path corresponding to the antenna having a relatively large per-antenna reception strength may be avoided. In one example, when the path loss of the RF path to be switched is a threshold or more, the electronic device 101 may not perform the RF switching operation. In another example, when the sum of the path loss and the antenna loss is a threshold or more, the electronic device 101 may not perform the RF switching operation. In another example, when the sum of the path loss and the difference in per-antenna reception strength is a threshold or more, the electronic device 101 may not perform the RF switching operation.

Figure 18:
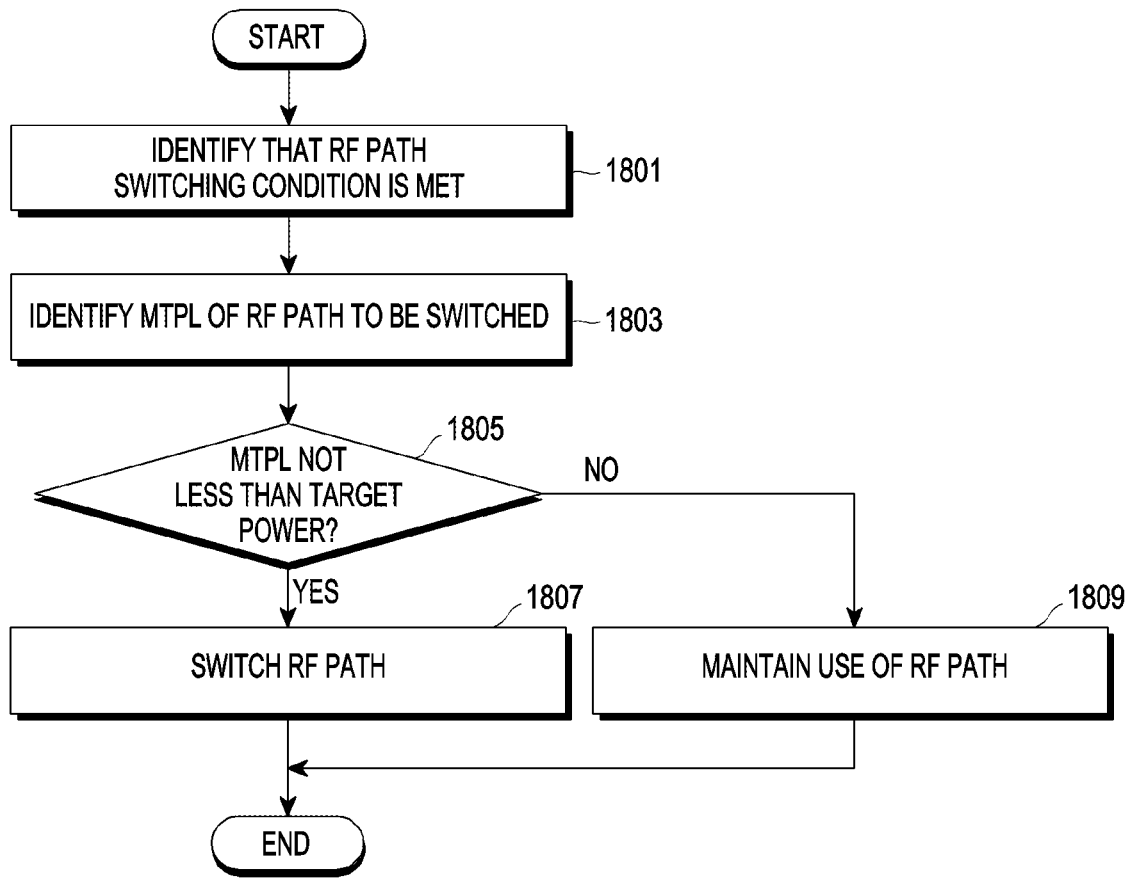
FIG. 18 is a flowchart illustrating a method for operating an electronic device according to various embodiments.

FIG. 18 is a flowchart illustrating a method for operating an electronic device according to various embodiments.

According to various embodiments, the electronic device 101 (e.g., the communication processor 301) may identify that the RF path switching condition is met in operation 1801. For example, the electronic device 101 may identify that the use time of the existing RF circuit is larger than or equal to the switching period. The electronic device 101 may identify the maximum transmission power limit (MTPL) of the RF path to be switched in operation 1803. In one example, the electronic device 101 may set the smaller of the transmission power corresponding to the class of the electronic device 101 and the back-off transmission power corresponding to, e.g., a grip event or SAR event, as the MTPL, but the scheme of setting the MTPL is not limited.

In operation 1805, the electronic device 101 may identify whether the identified MTPL is the target power or more. If the MTPL is the target power or more (Yes in 1805), the electronic device 101 may switch the RF path in operation 1807. If the identified MTPL is less than the target power (No in 1805), the electronic device 101 may maintain use of the current RF path in operation 1809. Since the electronic device 101 is unable to provide the RF signal in the transmission power of the MTPL or more, there is a chance of communication failure if the MTPL is less than the target power. Accordingly, when the MTPL is less than the target power, the electronic device 101 may refrain from RF circuit switching. For example, when the target power is 21 dBm, and the MTPL for the RF path to be switched is identified as 18 dBm due to back-off by a grip event, the electronic device 101 may maintain use of the existing RF circuit without performing switching.

Figure 19:
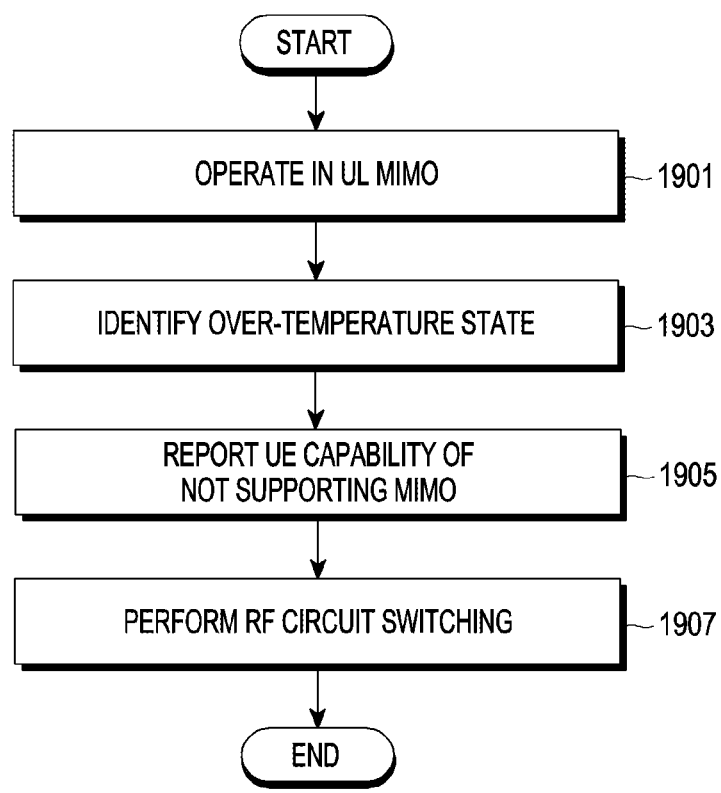
FIG. 19 is a flowchart illustrating a method for operating an electronic device according to various embodiments.

FIG. 19 is a flowchart illustrating a method for operating an electronic device according to various embodiments.

According to various embodiments, the electronic device 101 (e.g., the communication processor 301) may operate in uplink MIMO in operation 1901. The electronic device 101 may transmit a transmission signal using a plurality of RF circuits (e.g., the first RF circuit 305 and the second RF circuit 309) as it operates in uplink MIMO. While using the plurality of RF circuits, the electronic device 101 may identify the over-temperature state in operation 1903. In operation 1905, the electronic device 101 may report a UE capability of not supporting MIMO (e.g., SISO is supported) to the network. After reporting the UE capability, the electronic device 101 may perform RF circuit switching in operation 1907. The electronic device 101 may control the plurality of RF circuits (e.g., the first RF circuit 305 or second RF circuit 309) to alternately process RF signals.

Figure 20:
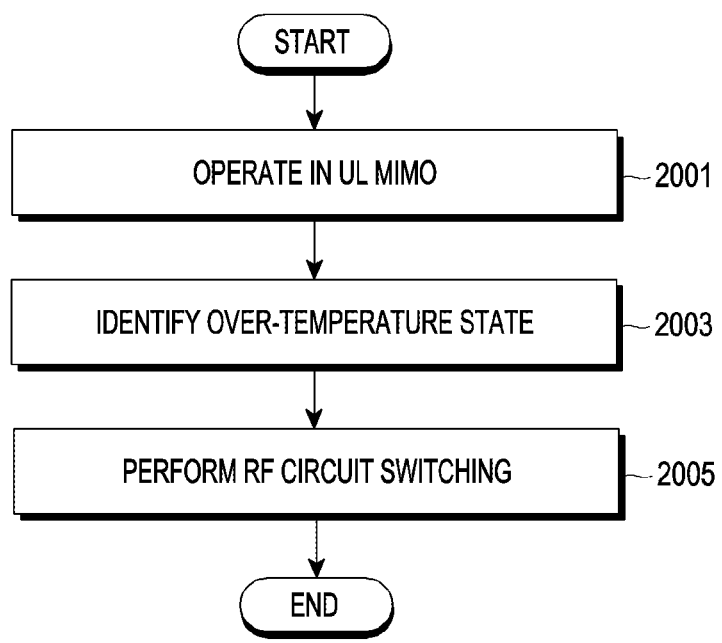
FIG. 20 is a flowchart illustrating a method for operating an electronic device according to various embodiments.

FIG. 20 is a flowchart illustrating a method for operating an electronic device according to various embodiments.

According to various embodiments, the electronic device 101 (e.g., the communication processor 301) may operate in uplink MIMO in operation 2001. The electronic device 101 may transmit a transmission signal using a plurality of RF circuits (e.g., the first RF circuit 305 and the second RF circuit 309) as it operates in uplink MIMO. While using the plurality of RF circuits, the electronic device 101 may identify the over-temperature state in operation 2003. In operation 2005, the electronic device 101 may perform RF circuit switching based on identifying the over-temperature state. Unlike in the embodiment of FIG. 19, in the embodiment of FIG. 20, the electronic device 101 may perform RF circuit switching without reporting the changed UE capability to the network. According to various embodiments, the electronic device 101 may process the RF signal using only any one RF circuit without reporting a change in UE capability. For example, the electronic device 101 may operate in SISO without reporting a change in UE capability. For example, when operating in MIMO, the electronic device 101 may process the RF signal by at least simultaneously using the first RF path and the second RF path. For example, when operating in SISO, the electronic device 101 may process the RF signal using any one of the first RF path and the second RF path.

Figure 21:
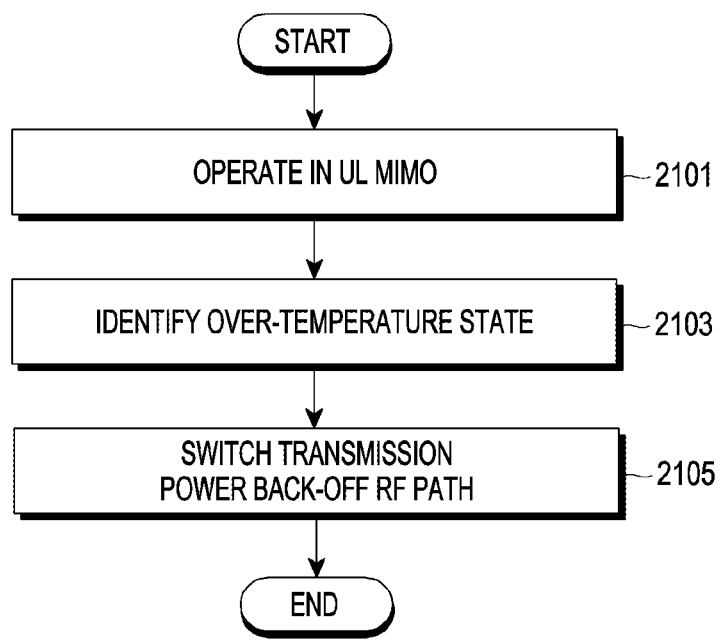
FIG. 21 is a flowchart illustrating a method for operating an electronic device according to various embodiments.

FIG. 21 is a flowchart illustrating a method for operating an electronic device according to various embodiments.

According to various embodiments, the electronic device 101 (e.g., the communication processor 301) may operate in uplink MIMO in operation 2101. The electronic device 101 may transmit a transmission signal using a plurality of RF circuits (e.g., the first RF circuit 305 and the second RF circuit 309) as it operates in uplink MIMO. While using the plurality of RF circuits, the electronic device 101 may identify the over-temperature state in operation 2103. In operation 2105, the electronic device 101 may switch the RF path of backing off the transmission power. For example, during a first period, the electronic device 101 may provide the RF signal of a first transmission power based on the first RF circuit 305 and provide the RF signal of a second transmission power based on the second RF circuit 309. The second transmission power may be larger than the first transmission power. In one example, the second transmission power may be 23 dBm, and the first transmission power may be −40 dBm. Meanwhile, during a second period, the electronic device 101 may provide the RF signal of the second transmission power based on the first RF circuit 305 and provide the RF signal of the first transmission power based on the second RF circuit 309. Meanwhile, according to various embodiments, the electronic device 101 may perform backoff on any one RF circuit based on the over-temperature state, without performing the switching operation. For example, when the first transmission power and the second transmission power both are 23 dBm, the over-temperature state is identified, so that the electronic device 101 may be implemented to change the first transmission power from 23 dBm to −40 dBm while maintaining the second transmission power as 23 dBm, in which case switching may not be performed.

According to various embodiments, an electronic device (e.g., the electronic device 101) may comprise at least one communication processor (e.g., at least one of the processor 120, the first communication processor 212, the second communication processor 214, the integrated communication processor 260, or the communication processor 301), at least one RFIC (e.g., at least one of the first RFIC 222, the second RFIC 224, the third RFIC 226, the fourth RFIC 228, the RFIC 303, or the RFIC 1301) configured to provide an RF signal based on a signal from the at least one communication processor, and a first RF circuit (e.g., at least one of the first RF circuit 305 or the first RF circuit 1303) and a second RF circuit (e.g., at least one of the second RF circuit 309 or the second RF circuit 1305) configured to process and provide the RF signal. The at least one communication processor (including communication processing circuitry) may be configured to control at least part of the electronic device to allow the first RF circuit to process at least one first RF signal provided from the RFIC, identify that a sum of times when the first RF circuit processes the at least one first RF signal is a designated period or more, and based on the sum of the times when the first RF circuit processes the at least one first RF signal being the designated period or more, stop use of the first RF circuit and control at least part of the electronic device to allow the second RF circuit to process at least one second RF signal provided from the RFIC.

According to various embodiments, the at least one communication processor may be configured to, as at least part of controlling the at least part of the electronic device to allow the second RF circuit to process the at least one second RF signal based on the sum of the times when the first RF circuit processes the at least one first RF signal being the designated period or more, identify whether a designated time unit elapses based on the sum of the times when the first RF circuit processes the at least one first RF signal being the designated period or more, and based on the elapse of the designated time unit, stop use of the first RF circuit and control at least part of the electronic device to allow the second RF circuit to process the at least one second RF signal.

According to various embodiments, the at least one communication processor may be further configured to maintain use of the first RF circuit based on the designated time unit not elapsing.

According to various embodiments, the at least one communication processor may be configured to, as at least part of controlling the at least part of the electronic device to allow the second RF circuit to process the at least one second RF signal based on the sum of the times when the first RF circuit processes the at least one first RF signal being the designated period or more, based on the temperature associated with an over-temperature state meeting a designated condition, control at least part of the electronic device to allow the second RF circuit to process the at least one second RF signal based on the sum of the times when the first RF circuit processes the at least one first RF signal being the designated period or more. The at least one communication processor may be further configured to perform at least one operation for designated temperature mitigation based on the temperature associated with the over-temperature state failing to meet the designated condition.

According to various embodiments, the at least one communication processor may be configured to, as at least part of identifying that the sum of the times when the first RF circuit processes the at least one first RF signal is the designated period or more, identify a time division-uplink-downlink configuration based on information received from a network, and identify that a time corresponding to a sum of a number of slots in which the first RF circuit processes the at least one first RF signal among at least one S slot and/or at least one U slot in the time division-uplink-downlink configuration is the designated period or more.

According to various embodiments, the at least one communication processor may be configured to, as at least part of controlling the at least part of the electronic device to allow the second RF circuit to process the at least one second RF signal based on the sum of the times when the first RF circuit processes the at least one first RF signal being the designated period or more, identify a first temperature corresponding to the first RF circuit and a second temperature corresponding to the second RF circuit, associated with the over-temperature state, and based on the first temperature and the second temperature meeting a designated condition, control at least part of the electronic device to allow the second RF circuit to process the at least one second RF signal based on the sum of the times when the first RF circuit processes the at least one first RF signal being the designated period or more. The at least one communication processor may be further configured to, based on the first temperature and the second temperature failing to meet the designated condition, control at least part of the electronic device to allow an RF circuit corresponding to a lower temperature of the first temperature and the second temperature to process at least one third RF signal.

According to various embodiments, the at least one communication processor may be further configured to identify a temperature associated with the over-temperature state, and identify the designated period based on the identified temperature.

According to various embodiments, the at least one communication processor may be configured to, as at least part of controlling the at least part of the electronic device to allow the first RF circuit to process the at least one first RF signal, control the first RF circuit based on first loss information associated with a first RF path corresponding to the first RF circuit, and as at least part of controlling the at least part of the electronic device to allow the second RF circuit to process the at least one second RF signal, control the second RF circuit based on second loss information associated with a second RF path corresponding to the second RF circuit.

According to various embodiments, the at least one communication processor may be configured to, as at least part of controlling the at least part of the electronic device to allow the second RF circuit to process the at least one second RF signal, control the at least part of the electronic device to allow the second RF circuit to process the at least one second RF signal based on the second loss information and/or a difference between a reception strength in an antenna corresponding to the first RF path and a reception strength in an antenna corresponding to the second RF path meeting a designated condition. The at least one communication processor may be further configured to maintain use of the first RF circuit based on the second loss information and/or the difference between the reception strength in the antenna corresponding to the first RF path and the reception strength in the antenna corresponding to the second RF path failing to meet the designated condition.

According to various embodiments, the at least one communication processor may be configured to, as at least part of controlling the at least part of the electronic device to allow the second RF circuit to process the at least one second RF signal, control the at least part of the electronic device to allow the second RF circuit to process the at least one second RF signal based on a maximum transmission power limit of an RF path corresponding to the second RF circuit being not less than target power corresponding to the at least one second RF signal. The at least one communication processor may be further configured to maintain use of the first RF circuit based on the maximum transmission power limit being less than the target power.

According to various embodiments, the at least one communication processor may be further configured to control the at least part of the electronic device to process at least one fourth RF signal using the first RF circuit and the second RF circuit based on the over-temperature state being not identified before controlling the at least part of the electronic device to allow the first RF circuit to process the at least one first RF signal.

According to various embodiments, the at least one communication processor may be further configured to, after controlling the at least part of the electronic device to process the at least one fourth RF signal and before controlling the at least part of the electronic device to process the at least one first RF signal, report a UE capability not supporting MIMO to a network based on identifying the over-temperature state.

According to various embodiments, the at least one communication processor may be configured to, as at least part of controlling the at least part of the electronic device to allow the first RF circuit to process the at least one first RF signal, control the at least part of the electronic device to allow the first RF circuit to process the at least one first RF signal while maintaining a UE capability supporting MIMO based on identifying the over-temperature state.

According to various embodiments, a method for operating an electronic device including at least one communication processor, at least one RFIC configured to provide an RF signal based on a signal from the at least one communication processor, and a first RF circuit and a second RF circuit configured to process and provide the RF signal may comprise controlling at least part of the electronic device to allow the first RF circuit to process at least one first RF signal provided from the RFIC in an over-temperature state, identifying that a sum of times when the first RF circuit processes the at least one first RF signal is a designated period or more, and based on the sum of the times when the first RF circuit processes the at least one first RF signal being the designated period or more, stopping use of the first RF circuit and controlling at least part of the electronic device to allow the second RF circuit to process at least one second RF signal provided from the RFIC.

According to various embodiments, controlling the at least part of the electronic device to allow the second RF circuit to process the at least one second RF signal based on the sum of the times when the first RF circuit processes the at least one first RF signal being the designated period or more may include identifying whether a designated time unit elapses based on the sum of the times when the first RF circuit processes the at least one first RF signal being the designated period or more, and based on the elapse of the designated time unit, stopping use of the first RF circuit and controlling at least part of the electronic device to allow the second RF circuit to process the at least one second RF signal.

According to various embodiments, the method may further comprise maintaining use of the first RF circuit based on the designated time unit not elapsing.

According to various embodiments, controlling the at least part of the electronic device to allow the second RF circuit to process the at least one second RF signal based on the sum of the times when the first RF circuit processes the at least one first RF signal being the designated period or more may include, based on a temperature associated with an over-temperature state meeting a designated condition, controlling at least part of the electronic device to allow the second RF circuit to process the at least one second RF signal based on the sum of the times when the first RF circuit processes the at least one first RF signal being the designated period or more. The method may further comprise performing at least one operation for designated temperature mitigation based on the temperature associated with the over-temperature state failing to meet the designated condition.

According to various embodiments, controlling the at least part of the electronic device to allow the second RF circuit to process the at least one second RF signal based on the sum of the times when the first RF circuit processes the at least one first RF signal being the designated period or more may include identifying a first temperature corresponding to the first RF circuit and a second temperature corresponding to the second RF circuit, associated with the over-temperature state, and based on the first temperature and the second temperature meeting a designated condition, controlling at least part of the electronic device to allow the second RF circuit to process the at least one second RF signal based on the sum of the times when the first RF circuit processes the at least one first RF signal being the designated period or more. The method may further comprise, based on the first temperature and the second temperature failing to meet the designated condition, controlling at least part of the electronic device to allow an RF circuit corresponding to a lower temperature of the first temperature and the second temperature to process at least one third RF signal.

According to various embodiments, the method may further comprise identifying a temperature associated with the over-temperature state, and identifying the designated period based on the identified temperature.

According to various embodiments, a method for operating an electronic device may further comprise controlling the at least part of the electronic device to process at least one fourth RF signal using the first RF circuit and the second RF circuit based on the over-temperature state being not identified before controlling the at least part of the electronic device to allow the first RF circuit to process the at least one first RF signal and reporting a UE capability not supporting MIMO to a network based on the over-temperature state after controlling the at least part of the electronic device to process the at least one fourth RF signal and before controlling the at least part of the electronic device to process the at least one first RF signal.

According to various embodiments, an electronic device may comprise at least one communication processor, at least one RFIC configured to provide an RF signal based on a signal from the at least one communication processor, and a first RF circuit and a second RF circuit configured to process and provide the RF signal. The at least one communication processor may be configured to, in an over-temperature state, control at least part of the electronic device to provide an RF signal of first transmission power to an antenna port of a first RF path corresponding to the first RF circuit and provide an RF signal of second transmission power to an antenna port of a second RF path corresponding to the second RF circuit, identify that a sum of times when the RF signal of the first transmission power is provided to the antenna port of the first RF path, and the RF signal of the second transmission power is provided to the antenna port of the second RF path is a designated period or more, and based on the sum of the times being the designated period or more, control at least part of the electronic device to provide the RF signal of the second transmission power to the antenna port of the first RF path corresponding to the first RF circuit and provide the RF signal of the first transmission power to the antenna port of the second RF path corresponding to the second RF circuit.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    at least one communication processor comprising circuitry;
    at least one radio frequency integrated circuit (RFIC) configured to provide a radio frequency (RF) signal based at least on a signal from the at least one communication processor; and
    a first RF circuit and a second RF circuit configured to process and provide the RF signal,
    wherein the at least one communication processor is individually and/or collectively configured to:
    control at least part of the electronic device to allow the first RF circuit to process at least one first RF signal provided from the RFIC in an over-temperature state,
    identify a time division-uplink-downlink configuration based at least on information received from a network, and
    identify that a time corresponding to a sum of a number of slots in which the first RF circuit processes the at least one first RF signal among at least one S slot and/or at least one U slot in the time division-uplink-downlink configuration is at least a value of a designated period, and
    based at least on the time being at least the value of the designated period, stop use of the first RF circuit and control at least part of the electronic device to allow the second RF circuit to process at least one second RF signal provided from the RFIC.

2. The electronic device of claim 1, wherein the at least one communication processor is configured to: as at least part of controlling the at least part of the electronic device to allow the second RF circuit to process the at least one second RF signal,
    identify whether a designated time unit elapses, and
    based at least on the elapse of the designated time unit, stop use of the first RF circuit and control at least part of the electronic device to allow the second RF circuit to process the at least one second RF signal.

3. The electronic device of claim 2, wherein the at least one communication processor is further configured to: maintain use of the first RF circuit based at least on the designated time unit not elapsing.

4. The electronic device of claim 1, wherein the at least one communication processor is configured to: as at least part of controlling the at least part of the electronic device to allow the second RF circuit to process the at least one second RF signal,
    based at least on a temperature associated with the over-temperature state meeting a designated condition, control at least part of the electronic device to allow the second RF circuit to process the at least one second RF signal, and
    wherein the at least one communication processor is further configured to: perform at least one operation for designated temperature mitigation based at least on the temperature associated with the over-temperature state failing to meet the designated condition.

5. The electronic device of claim 1, wherein the at least one communication processor is configured to: as at least part of controlling the at least part of the electronic device to allow the second RF circuit to process the at least one second RF signal, identify a first temperature corresponding to the first RF circuit and a second temperature corresponding to the second RF circuit, associated with the over-temperature state, and based at least on the first temperature and the second temperature meeting a designated condition, control at least part of the electronic device to allow the second RF circuit to process the at least one second RF signal, and wherein the at least one communication processor is further configured to, based at least on the first temperature and the second temperature failing to meet the designated condition, control at least part of the electronic device to allow an RF circuit corresponding to a lower temperature of the first temperature and the second temperature to process at least one third RF signal.

6. The electronic device of claim 1, wherein the at least one communication processor is further configured to:
identify a temperature associated with the over-temperature state, and
identify the designated period based at least on the identified temperature.

7. The electronic device of claim 1, wherein the at least one communication processor is configured to:
as at least part of controlling the at least part of the electronic device to allow the first RF circuit to process the at least one first RF signal, control the first RF circuit based at least on first loss information associated with a first RF path corresponding to the first RF circuit, and
as at least part of controlling the at least part of the electronic device to allow the second RF circuit to process the at least one second RF signal, control the second RF circuit based at least on second loss information associated with a second RF path corresponding to the second RF circuit.

8. The electronic device of claim 7, wherein the at least one communication processor is configured to:
as at least part of controlling the at least part of the electronic device to allow the second RF circuit to process the at least one second RF signal, control the at least part of the electronic device to allow the second RF circuit to process the at least one second RF signal based at least on the second loss information and/or a difference between a reception strength in an antenna corresponding to the first RF path and a reception strength in an antenna corresponding to the second RF path meeting a designated condition, and
wherein the at least one communication processor is further configured to maintain use of the first RF circuit based at least on the second loss information and/or the difference between the reception strength in the antenna corresponding to the first RF path and the reception strength in the antenna corresponding to the second RF path failing to meet the designated condition.

9. The electronic device of claim 1, wherein the at least one communication processor is configured to:
as at least part of controlling the at least part of the electronic device to allow the second RF circuit to process the at least one second RF signal, control the at least part of the electronic device to allow the second RF circuit to process the at least one second RF signal based at least on a maximum transmission power limit of an RF path corresponding to the second RF circuit being not less than target power corresponding to the at least one second RF signal, and wherein the at least one communication processor is further configured to: maintain use of the first RF circuit based at least on the maximum transmission power limit being less than the target power.

10. The electronic device of claim 1, wherein the at least one communication processor is further configured to:
control the at least part of the electronic device to process at least one fourth RF signal using the first RF circuit and the second RF circuit based at least on the over-temperature state being not identified before controlling the at least part of the electronic device to allow the first RF circuit to process the at least one first RF signal.

11. The electronic device of claim 10, wherein the at least one communication processor is further configured to:
after controlling the at least part of the electronic device to process the at least one fourth RF signal and before controlling the at least part of the electronic device to process the at least one first RF signal,
report a UE capability not supporting MIMO to a network based at least on identifying the over-temperature state.

12. The electronic device of claim 10, wherein the at least one communication processor is configured to:
as at least part of controlling the at least part of the electronic device to allow the first RF circuit to process the at least one first RF signal,
control the at least part of the electronic device to allow the first RF circuit to process the at least one first RF signal while maintaining a UE capability supporting MIMO based at least on identifying the over-temperature state.

13. A method for operating an electronic device including at least one communication processor, at least one radio frequency integrated circuit (RFIC) configured to provide a radio frequency (RF) signal based at least on a signal from the at least one communication processor, and a first RF circuit and a second RF circuit configured to process and provide the RF signal, the method comprising:
controlling at least part of the electronic device to allow the first RF circuit to process at least one first RF signal provided from the RFIC in an over-temperature state;
identifying a time division-uplink-downlink configuration based at least on information received from a network, and
identifying that a time corresponding to a sum of a number of slots in which the first RF circuit processes the at least one first RF signal among at least one S slot and/or at least one U slot in the time division-uplink-downlink configuration is at least a value of a designated period; and
based at least on the time being at least the value of the designated period, stopping use of the first RF circuit and controlling at least part of the electronic device to allow the second RF circuit to process at least one second RF signal provided from the RFIC.

14. The method of claim 13, wherein controlling the at least part of the electronic device to allow the second RF circuit to process the at least one second RF signal includes,
identifying whether a designated time unit elapses, and
based at least on the elapse of the designated time unit, stopping use of the first RF circuit and controlling at least part of the electronic device to allow the second RF circuit to process the at least one second RF signal.

15. The method of claim 14, further comprising maintaining use of the first RF circuit based at least on the designated time unit not elapsing.

16. The method of claim 13, wherein controlling the at least part of the electronic device to allow the second RF circuit to process the at least one second RF signal includes,
based at least on a temperature associated with an over-temperature state meeting a designated condition, controlling at least part of the electronic device to allow the second RF circuit to process the at least one second RF signal, and
wherein the method further comprises performing at least one operation for designated temperature mitigation based at least on the temperature associated with the over-temperature state failing to meet the designated condition.

17. The method of claim 13, wherein controlling the at least part of the electronic device to allow the second RF circuit to process the at least one second RF signal includes:
identifying a first temperature corresponding to the first RF circuit and a second temperature corresponding to the second RF circuit, associated with the over-temperature state, and
based at least on the first temperature and the second temperature meeting a designated condition, controlling at least part of the electronic device to allow the second RF circuit to process the at least one second RF signal, and
wherein the method further comprises, based at least on the first temperature and the second temperature failing to meet the designated condition, controlling at least part of the electronic device to allow an RF circuit corresponding to a lower temperature of the first temperature and the second temperature to process at least one third RF signal.

18. The method of claim 13, further comprising:
identifying a temperature associated with the over-temperature state, and
identifying the designated period based at least on the identified temperature.

19. An electronic device comprising:
at least one communication processor comprising circuitry;
at least one RFIC configured to provide an RF signal based at least on a signal from the at least one communication processor, and
a first RF circuit and a second RF circuit configured to process and provide the RF signal,
wherein the at least one communication processor is configured to:
in an over-temperature state, control at least part of the electronic device to provide an RF signal of first transmission power to an antenna port of a first RF path corresponding to the first RF circuit and provide an RF signal of second transmission power to an antenna port of a second RF path corresponding to the second RF circuit,
identify that a sum of times when the RF signal of the first transmission power is provided to the antenna port of the first RF path, and the RF signal of the second transmission power is provided to the antenna port of the second RF path is at least a value of a designated period, and
based at least on the sum of the times being at least the value of the designated period, control at least part of the electronic device to provide the RF signal of the second transmission power to the antenna port of the first RF path corresponding to the first RF circuit and provide the RF signal of the first transmission power to the antenna port of the second RF path corresponding to the second RF circuit.

* * * * *